United States Patent
Nako

(10) Patent No.: US 8,487,902 B2
(45) Date of Patent: Jul. 16, 2013

(54) IMAGE INPUT DEVICE AND IMAGE INPUT METHOD

(75) Inventor: Kazuyuki Nako, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 661 days.

(21) Appl. No.: 12/675,243

(22) PCT Filed: Aug. 29, 2008

(86) PCT No.: PCT/JP2008/065509
§ 371 (c)(1),
(2), (4) Date: Feb. 25, 2010

(87) PCT Pub. No.: WO2009/028652
PCT Pub. Date: Mar. 5, 2009

(65) Prior Publication Data
US 2010/0245270 A1    Sep. 30, 2010

(30) Foreign Application Priority Data

Aug. 30, 2007 (JP) .................. 2007-224327

(51) Int. Cl.
*G09G 5/00* (2006.01)
(52) U.S. Cl.
USPC .......................................... 345/174; 345/209
(58) Field of Classification Search
USPC ............. 345/87–98, 173–179, 204–215, 690; 178/18.01–18.07
See application file for complete search history.

(56) References Cited

U.S. PATENT DOCUMENTS

| 6,747,290 B2 * | 6/2004 | Yamazaki et al. | 257/59 |
| 7,161,185 B2 * | 1/2007 | Yamazaki et al. | 257/88 |
| 2004/0263069 A1 | 12/2004 | Yamazaki et al. | |
| 2007/0108454 A1 | 5/2007 | Yamazaki et al. | |

FOREIGN PATENT DOCUMENTS

| CN | 1577416 A | 2/2005 |
| JP | 2004-318819 | 11/2004 |
| JP | 2005-037930 | 2/2005 |
| JP | 2005-115661 | 4/2005 |
| JP | 2005-167934 | 6/2005 |
| JP | 2006-186947 | 7/2006 |
| JP | 2006-333162 | 12/2006 |
| JP | 2007-173946 | 7/2007 |

OTHER PUBLICATIONS

International Search Report for PCT/JP2008/065509, mailed Dec. 2, 2008.
Brown et al., "A 2.6 inch VGA LCD with Optical Input Function using a 1-Transistor Active-Pixel Sensor", Digest of Technical Papers, (Nov. 2007), pp. 132-133 & 592.

* cited by examiner

*Primary Examiner* — Vijay Shankar
(74) *Attorney, Agent, or Firm* — Nixon & Vanderhye P.C.

(57) ABSTRACT

An image input device is provided with: a display unit for displaying an image, the display unit including a transparent flat plate; an image sensing unit for sensing an image on a contact surface of a document placed on the flat plate, the contact surface being in contact with the display unit; a contact sensing unit for sensing a contact of the document with the flat plate; and a display control unit for controlling to display an image in an even and specific color when the contact of the document has been sensed by the contact sensing unit.

17 Claims, 17 Drawing Sheets

FIG.15
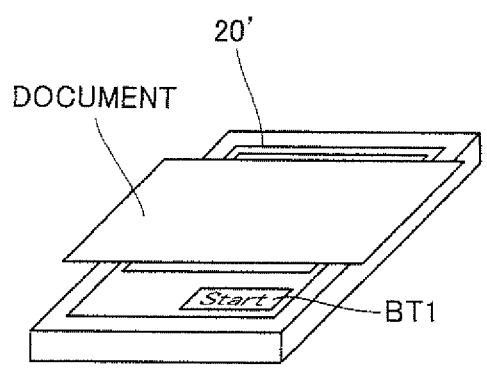
(a)
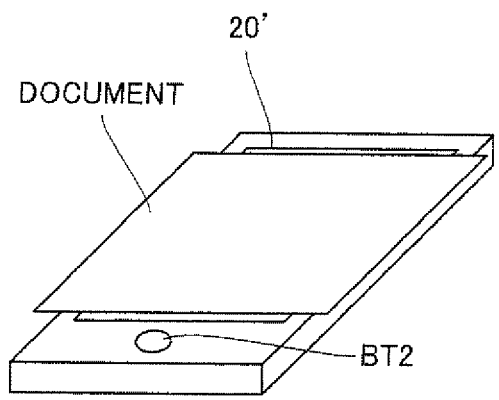
(b)

IMAGE INPUT DEVICE AND IMAGE INPUT METHOD

This application is the U.S. national phase of International Application No. PCT/JP2008/065509 filed 29 Aug. 2008, which designated the U.S. and claims priority to Japan Application No. 2007-224327 filed 30 Aug. 2007, the entire contents of each of which are hereby incorporated by reference.

TECHNICAL FIELD

The present technology relates to image input devices and image input methods, and in particular to an image input device integrated with a display function and an image input method.

BACKGROUND ART

A device in which a liquid crystal is combined with a touch panel is widely used as a display and operation unit for a small-sized information terminal and such. A user can operate the terminal by touching buttons displayed on a liquid crystal screen using a stylus or a finger. Although touch panels of a pressure-sensitive type and a capacitance type have been contrived, a problem of deterioration of image quality has been noted because such a touch panel has to be provided over a liquid crystal surface. In addition, as this increases the number of component parts, a problem of increased cost for members and assembly has also been noted.

According to Patent Document 1 (Japanese Patent Laying-Open No. 2004-318819), a technique of providing an optical sensor along with a circuit that drives a liquid crystal on a glass substrate has been contrived. With this technique, an input of an image, in addition to a display of an image, is possible as in a case in which commonly used scanners are used. Further, it is possible to use as a touch panel by processing the inputted image. As this type of touch panels can be manufactured in the same process as common liquid crystal display devices without additionally providing pressure-sensitive or capacitance touch panel members, it is also possible to reduce the cost.

Patent Document 1: Japanese Patent Laying-Open No. 2004-318819

DISCLOSURE OF THE TECHNOLOGY

Problems to be Solved by the Technology

However, with a device having functions of both displaying an image and inputting an image according to the technique of Patent Document 1, it is difficult to input an image of a document in a user-friendly manner with high accuracy.

The present technology has been contrived in order to address the above problem, and aims to provide an image input device having functions of both displaying an image and inputting an image, capable of capturing an image of a document in a user-friendly manner with high accuracy, and an image input method for such a device.

Means for Solving the Problems

An image input device according to one aspect of the present technology includes: a display unit for displaying an image, the display unit including a transparent flat plate; an image sensing unit for sensing an image on a contact surface of a document placed on the flat plate, the contact surface being in contact with the flat plate; a contact sensing unit for sensing a contact of the document with the flat plate; and a display control unit for controlling to display an image in an even and specific color when the contact of the document has been sensed by the contact sensing unit.

Preferably, the image input device further includes: an image sensing instruction unit for outputting an image sensing instruction to sense the image on the contact surface to the image sensing unit when the image in the specific color is displayed; and an image input unit for inputting the image that has been sensed by the image sensing unit in response to the image sensing instruction.

Preferably, the image input device further includes: a stationary state sensing unit for sensing a stationary state of the document when the contact of the document has been sensed by the contact sensing unit, wherein the image sensing instruction unit instructs to sense the image on the contact surface when the image in the specific color is displayed and the stationary state of the document has been sensed by the stationary state sensing unit.

Preferably, the display control unit: displays a message to prompt a user to place the document on the flat plate when an image input is instructed from the user, and switches the message to the image in the specific color.

Preferably, the image input device further includes: a stationary state sensing unit for sensing a stationary state of the document when the contact of the document has been sensed by the contact sensing unit, wherein the display control unit switches the message to the image in the specific color when the stationary state of the document has been sensed by the stationary state sensing unit.

Preferably, the specific color is white.

Alternatively, it is preferable that the specific color includes first, second, and third colors, the display control unit switches the image to be displayed in the display unit to images in the first, second, and third colors when the contact of the document has been sensed by the contact sensing unit.

Preferably, the image input device further includes: an image sensing instruction unit for outputting an image sensing instruction to sense the image on the contact surface every time when switching to one of the images in the first, second, and third colors; an image input unit for inputting the respective images of color components of the first, second, and third colors that have been sensed by the image sensing unit in response to the image sensing instruction; and a synthesizing unit for synthesizing the respective images of color components of the first, second, and third colors that have been inputted by the image input unit.

Preferably, the first, second, and third colors are any of red, green, and blue, respectively.

Preferably, the contact sensing unit instructs the image sensing unit to sense the image on the contact surface on a predetermined cycle, and senses the contact of the document based on an edge feature of the sensed image.

Preferably, the contact sensing unit senses the contact of the document based on an output from a pressure sensor for sensing a pressure applied from outside to the display unit.

An image input device according to another aspect of the present technology includes: a display unit for displaying an image, the display unit including a transparent flat plate; an image sensing unit for sensing an image on a contact surface of a document in contact with the flat plate, the contact surface being in contact with the flat plate; a stationary state sensing unit for sensing a stationary state of the document that is in contact with the flat plate; an image sensing instruction unit for outputting an image sensing instruction to sense the image on the contact surface to the image sensing unit when the stationary state of the document is sensed by the stationary state sensing unit; and an image input unit for inputting the image that has been sensed by the image sensing unit in response to the image sensing instruction.

Preferably, the stationary state sensing units instructs the image sensing unit to sense the image on the contact surface on a predetermined cycle, and senses the stationary state of the document based on an edge feature and a time difference of the sensed image.

An image input device according to yet another aspect of the present technology includes: a display unit for displaying an image, the display unit including a transparent flat plate; an image sensing unit for sensing an image on a contact surface of a document in contact with the flat plate, the contact surface being in contact with the flat plate; an image input unit for inputting the image on the contact surface that has been sensed by the image sensing unit; a removal sensing unit for sensing removal of the contact of the document with the flat plate; a display control unit for displaying a button area in the display unit for accepting an instruction from a user; and a determination unit for determining whether an object is in contact or noncontact with the button area, wherein the determination by the determination unit is disabled while a sensing process is carried out by the removal sensing unit.

Preferably, the removal sensing unit instructs the image sensing unit to sense the image on the contact surface on a predetermined cycle, and senses the removal of the contact of the document based on an edge feature of the sensed image.

Preferably, the removal sensing unit includes a pressure sensor for sensing a pressure applied from outside to the display unit.

An image input method according to another aspect of the present technology includes: a step of sensing a contact of a document with a transparent flat plate provided for a display unit; a step of displaying an image in an even and specific color when the contact of the document has been sensed; and a step of inputting an image on a contact surface that is in contact with the flat plate by sensing the image on the contact surface when the image in the specific color is displayed.

Effects of the Technology

According to the present technology, it is possible to capture an image of a document with high accuracy using an image input device having functions of both displaying an image and inputting an image. Further, it is possible to solve a disadvantage that a user is at a loss about how to operate.

BRIEF DESCRIPTION OF THE DRAWINGS

FIG. 15(a) and FIG. 15(b) show a diagram for illustration of a problem in commonly used image input devices.

DESCRIPTION OF THE REFERENCE SIGNS

Figure 1:
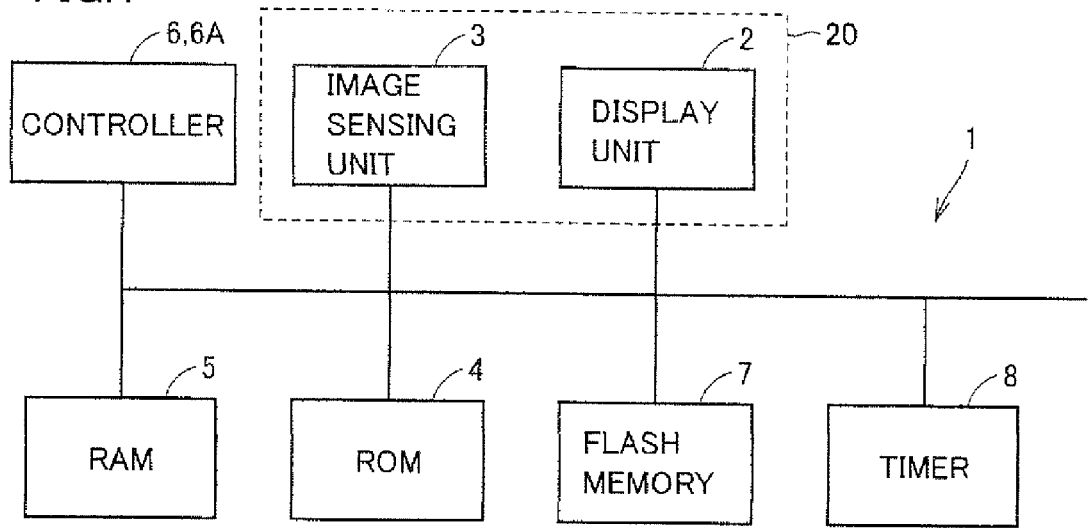
FIG. 1 shows a hardware block diagram of an image input device according to embodiments of the present technology.

1—image input device, 2—display unit, 3—image sensing unit, 4—RAM, 5—ROM, 6, 6A—controller, 7—flash memory, 8—timer, 20—display and image sensing device, 30—optical sensor, 31—pixel TFT, 32—display control TFT, 33—image capture sensor, 34—static memory device, 35—initialization TFT, 36—data retention TFT, 61—contact sensing unit, 62—stationary state sensing unit, 63, 63A—display control unit, 64—image sensing instruction unit, 65—image input unit, 66—removal sensing unit, 68—image synthesizing unit, 631, 631A—screen switching unit, 201—pixel array unit, 202—signal line drive circuit, 203—scanning line drive circuit, 204—signal processing output circuit, 205—synchronization signal generation circuit, 130—driver, 131—scanning signal line drive circuit, 132—data signal line drive circuit, 133—optical sensor drive circuit, 134—switch, 135—amplifier, 140—liquid crystal panel, 141—pixel circuit, 141b, 141g, 141r—sub-pixel circuit, 143—electrode pair, 143a—pixel electrode, 143b—opposite electrode, 144—optical sensor circuit, 145—photodiode, 146—capacitor, 151A—active matrix substrate, 151B—opposite substrate, 152—liquid crystal layer, 153b—color filter, 153g—color filter, 153r—color filter, 157—data signal line, 161 polarization filter, 162—glass substrate, 163—light shielding film, 164—oriented film, 179—backlight, 180—image processing engine, 181—driver controlling device, 182—timer, 183—signal processing device, and 178—internal IF.

BEST MODES FOR CARRYING OUT THE TECHNOLOGY

The following describes embodiments according to the present technology with reference to the drawing. In the description below, like components are denoted by like reference numerals. Names and functions of these components are also the same. Therefore, detailed descriptions for these components will not be repeated.

First Embodiment

FIG. 1 shows a hardware block diagram of an image input device 1 according to this embodiment of the present technology. Small-sized information terminals of PDAs (Personal Digital Assistants) and mobile phone are assumed to be examples of image input device 1.

Referring to FIG. 1, image input device 1 is provided with a display unit 2 for displaying an image, an image sensing unit 3 for sensing an image, a ROM (Read Only Memory) 4, a RAM (Random Access Memory) 5, a controller 6, a nonvolatile memory such as a flash memory 7, and a timer 8 for counting time.

Controller 6 is implemented as a CPU (Central Processing Unit) and a program executed by the CPU, and controls a function of image input device 1 as a whole. ROM 4 and RAM 5 store programs, working data, and the like. Display unit 2 displays a menu, a message to a user, an image, and the like. Display unit 2 has a transparent flat plate on an upper surface thereof, and image sensing unit 3 senses an image of a document placed on the flat plate. Image sensing unit 3 also detects a touching operation by the user of the menu and a button displayed on display unit 2. While this embodiment is described to use image sensing unit 3 in order to detect the touching operation by the user, a pressure-sensitive or capacitance type touch panel having a contact sensing function can be separately used.

In a case in which image input device 1 according to this embodiment is a PDA or a mobile phone, image input device 1 is further provided with hardware that enables image input device 1 to function as a PDA or mobile phone, such as a communication I/F (not shown in the drawing) for connecting to the Internet, an audio output unit (not shown in the drawing), and an audio input unit (not shown in the drawing).

Figure 2:
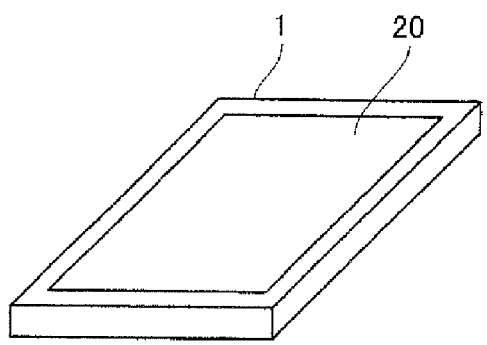
FIG. 2 shows an external view of the image input device according to the embodiments of the present technology.

FIG. 2 shows an external view of image input device 1 according to this embodiment.

Over a surface of image input device 1, a display and image sensing device 20 implemented as an LCD (Liquid Crystal Display) is disposed, and display and image sensing device 20 realizes functions of display unit 2 and image sensing unit 3.

Next, a hardware configuration of display and image sensing device 20 is further described. Although not particularly limited, the configuration disclosed in Patent Document 1 can be adopted as the hardware configuration of display and image sensing device 20, and the following roughly describes this configuration.

Specifically, with display and image sensing device 20 of image input device 1 shown in FIG. 1, a sensor for capturing an image is provided for each pixel. An opposite substrate whose common electrodes are made of a transparent electrode material such as ITO (Indium Tin Oxide) is disposed at a predetermined distance from an LCD substrate. The LCD substrate and the opposite substrate are sealed after a liquid crystal material is filled therebetween, and polarization plates are applied to external surfaces of the both substrates.

Figure 3:
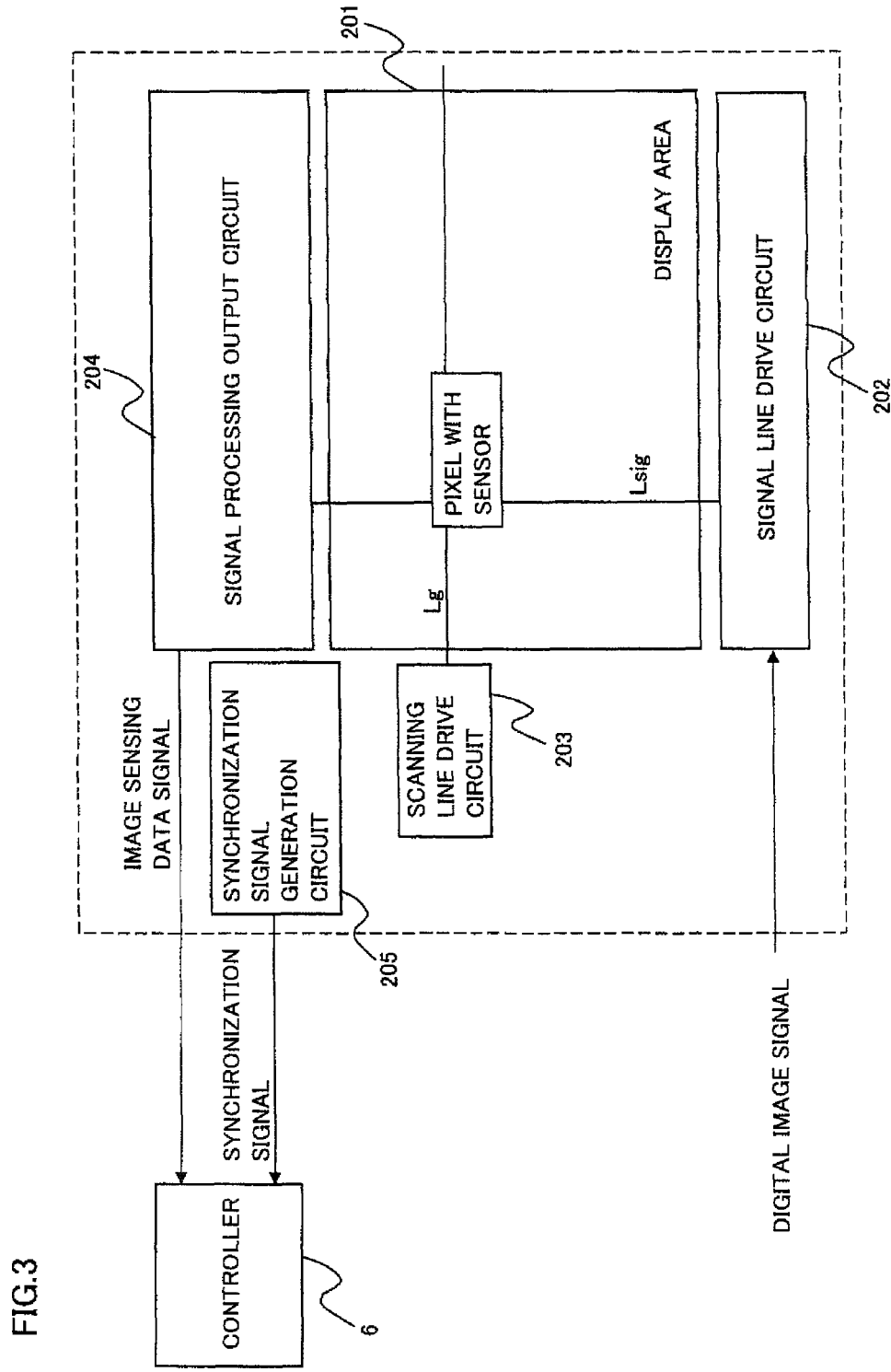
FIG. 3 shows a block diagram schematically illustrating a configuration of a display and image sensing device according to the embodiments of the present technology.

FIG. 3 shows a block diagram schematically illustrating a configuration of display and image sensing device 20.

Display and image sensing device 20 is provided with a pixel array unit 201 on which signal lines and scanning lines are disposed, a signal line drive circuit 202 that drives the signal lines, a scanning line drive circuit 203 that drives the scanning lines, a signal processing output circuit 204 that serially outputs sensed image data from the sensor, and a synchronization signal generation circuit 205. Controller 6 also processes the sensed image data.

Pixel array unit 201 is formed on the LCD substrate using a low-temperature polysilicon TFT (Thin Film Transistor) as a switching device. Further, signal line drive circuit 202, scanning line drive circuit 203, and signal processing output circuit 204 are at least partially formed on the LCD substrate using the low-temperature polysilicon TFT. A sensor for receiving light is also formed on this LCD substrate. While the LCD substrate can be provided as either of the upper surface or a lower surface of display and image sensing device 20, it is desirable to provide as the upper surface in perspective of light sensitivity of the sensor.

In pixel array unit 201, a color filter of a corresponding color is provided for a sub-pixel, for example, in each pixel. As a light source (not shown in the drawing) that supplies backlight from a rear surface of the LCD substrate, a white LED (Light Emitting Diode), for example, is provided.

It is possible to carry out grayscale display by changing transmissivity of liquid crystals based on a voltage written to an auxiliary capacitance Cs of the sub-pixel.

A digital-analog converter DAC (not shown in the drawing) is provided within signal line drive circuit 202, and signal line drive circuit 202 converts digital pixel data inputted on a predetermined cycle from an external circuit to analog pixel voltage appropriate to drive the liquid crystals, and drives signal lines Lsig.

Scanning line drive circuit 203 sequentially selects a scanning line Lg, and a signal is fed to pixels of a line corresponding to the selected scanning line from signal line drive circuit 202.

Signal processing output circuit 204 successively amplifies sensed image data that appears from the selected pixel in synchronization with a clock from synchronization signal generation circuit 205, and transmits the amplified data externally.

Figure 4:
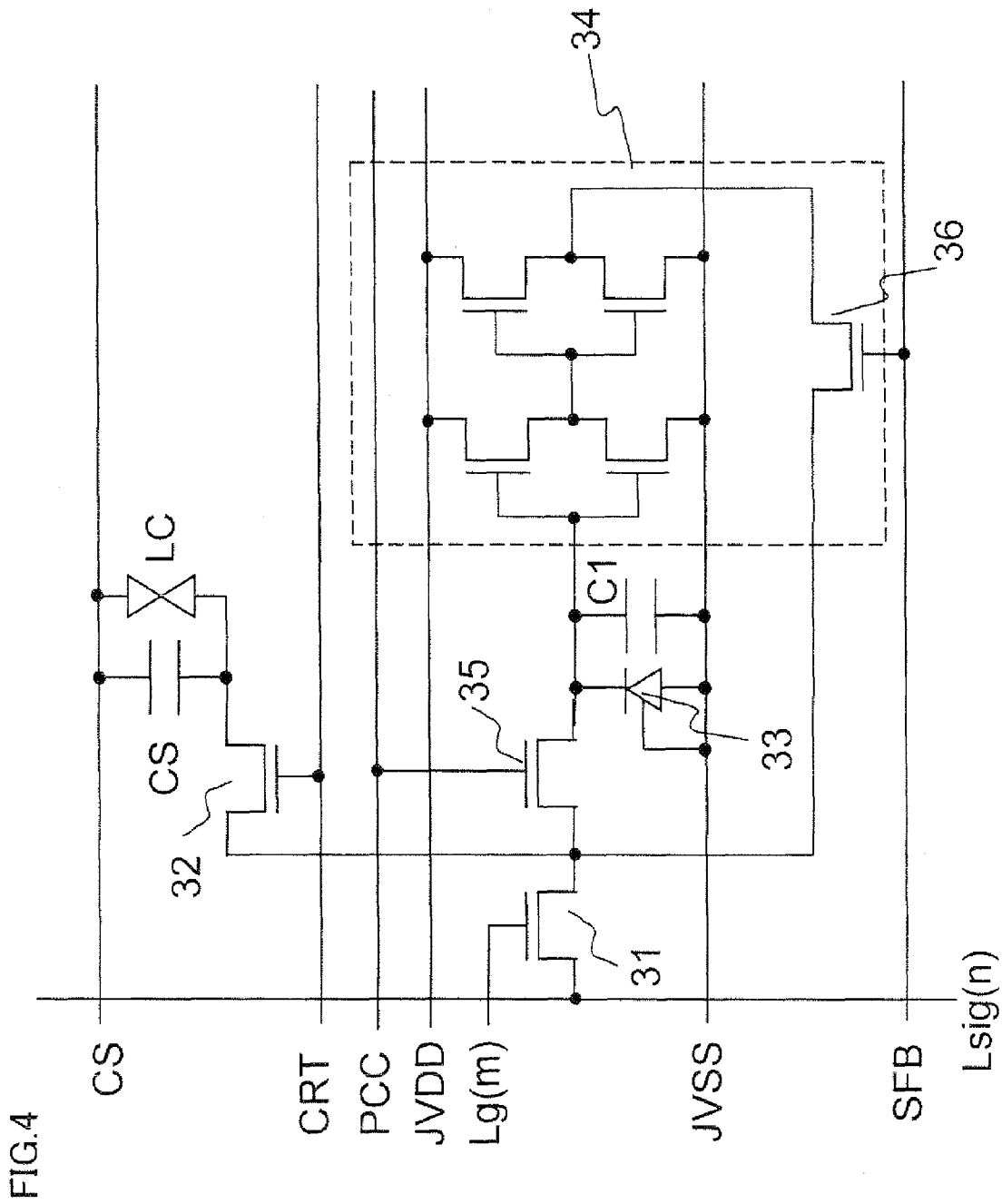
FIG. 4 shows a detailed circuit diagram of a sub-pixel provided with a sensor in a single pixel of a pixel array unit shown in FIG. 3.

FIG. 4 shows a detailed circuit diagram of a sub-pixel provided with a sensor in a single pixel of pixel array unit 201.

As shown in FIG. 4, a single pixel is provided with a pixel TFT 31, a display control TFT 32 that controls whether or not a charge is stored in auxiliary capacitance Cs, image capture sensors 33 each sensing an image of incident light of a predetermined range, a capacitor C1 (hereinafter also referred to as a sensor capacitance) that stores results of image sensing by sensors 33, a static memory device 34 that stores binary data corresponding to the stored charge in capacitor C1, and an initialization TFT 35 that charges an initial charge to capacitor C1. Static memory device 34 is provided with two inverters in cascade connection, and has the same configuration as that of a memory device of a common SRAM (Static Random Access Memory). Static memory device 34 is able to binarize a potential of capacitor C1, and retain the binarized data by being connected in loop when TFT 35 and a TFT 36 are turned on at the same time.

When capacitor C1 is initialized, pixel TFT 31 and initialization TFT 35 are turned on. When an analog pixel voltage (analog pixel data) for setting luminance of a display element is written to auxiliary capacitance Cs, pixel TFT 31 and display control TFT 32 are turned on. When data retention (refresh) of static memory device 34 is carried out, initialization TFT 35 and data retention TFT 36 within static memory device 34 are both turned on. When sensed image data stored in static memory device 34 is fed to the signal lines, pixel TFT 31 and data retention TFT 36 are both turned on.

Accordingly, display and image sensing device 20 is able to carry out a normal display operation as well as an image capturing operation like a scanner.

When carrying out the normal display operation, TFTs 35 and 36 are set to be an off state, and static memory device 34 does not store any valid data. In this case, the signal lines are fed with a signal line voltage from signal line drive circuit 202, and a display according to this signal line voltage is carried out.

On the other hand, when carrying out the image capturing operation, an object whose image is to be captured (for example, a sheet of paper of a document) is disposed on an upper surface side of the LCD, and light from a backlight is irradiated to the sheet of paper through a glass substrate of the LCD. Light reflected on the sheet of paper is received by sensor 33 on the LCD substrate and, an image is captured.

For a sub-pixel for which a sensor is not provided, a liquid crystal LC, auxiliary capacitance Cs, and switching transistors (pixel TFT 31 and display control TFT 32) are provided, excluding a circuitry relating to sensor 33 and static memory device 34 from the configuration shown in FIG. 4.

Figure 5:
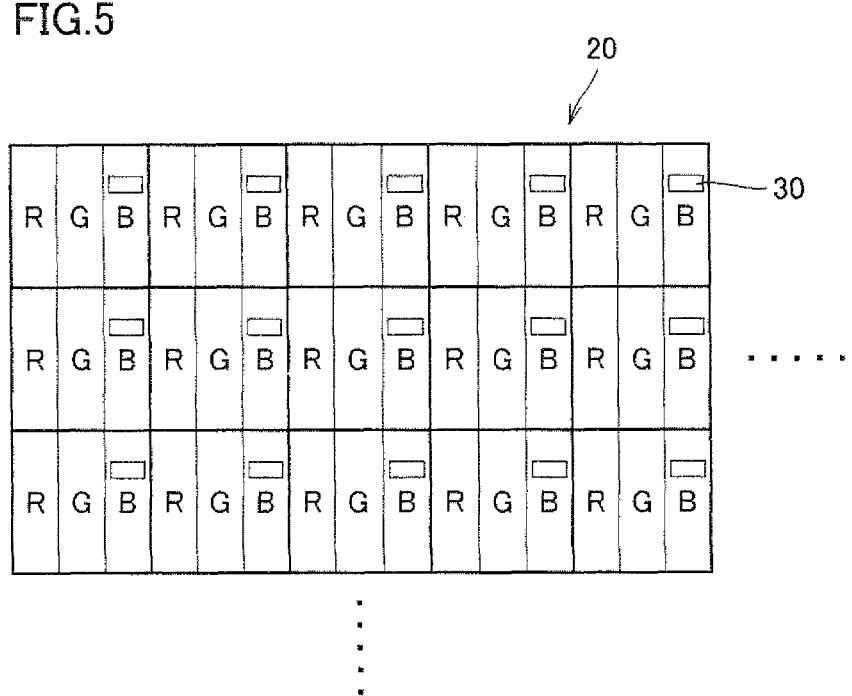
FIG. 5 shows a schematic diagram of an LCD for describing the display and image sensing device according to the embodiments of the present technology.

FIG. 5 shows a schematic diagram of the LCD for describing display and image sensing device 20.

The pixels in display and image sensing device 20 are each configured by three sub-pixels respectively having color filters of R (red), G (green), and B (blue) for displaying a color image, and are disposed in matrix. Further, an optical sensor 30 is disposed in each pixel, and, in total, implemented as image sensing unit 3. Although optical sensor 30 is disposed in a sub-pixel for B (blue) in FIG. 5, optical sensor 30 can be disposed in a sub-pixel for a different color. Further, in order to eliminate sensitivity dependency based on color, a color filter above optical sensor 30 can include a window. Alternatively, instead of providing a window for the color filter, optical sensors can be further disposed on all of the sub-pixels for R (red), G (green), and B (blue), respectively, so that a color image can be sensed with a single image sensor.

In the meantime, when inputting an image of a document while displaying any kind of image, a device having the functions of both displaying an image and inputting an image like image input device 1 often displays the displayed image overlapping with the inputted image. Therefore, a display area is required to be filled with such as white. However, as the display area also serves as an interface with which the user operates the small-sized information terminal, the user can be at a loss about how to operate the terminal if an entire display area are filled.

Moreover, when a button for instructing image capture is displayed in the display area, the display area is covered by a document and an image is inputted in a small area excluding an area in which the button is displayed. For example, there is a problem that, when a button BT1 is displayed in a display and image sensing device 20' as shown in FIG. 15(a), an area for image capture with respect to the device decreases by an area for button BT1 and it is not possible to utilize an entire screen effectively. It should be noted that the device is denoted as display and image sensing device 20' in FIG. 15 in order to differentiate from display and image sensing device 20 of image input device 1 of this embodiment.

Alternatively, a hardware button BT2 can be additionally provided as shown in FIG. 15(b). However, in this case, a problem arises that a size of the small-sized information terminal itself increases, in addition to cost for preparing button BT2.

As described above, a problem has been noted that, when the document image is inputted using the device having functions of both displaying an image and inputting an image, an entire screen cannot be utilized effectively, or an additional button for instructing image input is required. Further, there is another problem that, as it is necessary to fill the screen with such as white before placing a document on an image capturing plane, e.g., the flat plate of display unit 2 (display and image sensing device 20) (hereinafter simply referred to as "display unit 2"), it is not possible to display a message for the user, and it is confusing for the user to operate the device. Moreover, there is also a problem that, when image information that has been inputted is processed to be implemented as a touch panel, if the document remains placed on the image capturing plane, the image information of the document is falsely recognized as a finger and the like, thereby causing an erroneous operation.

According to image input device 1 of this embodiment, the above noted problems can be solved. The following describes this in detail.

Figure 6:
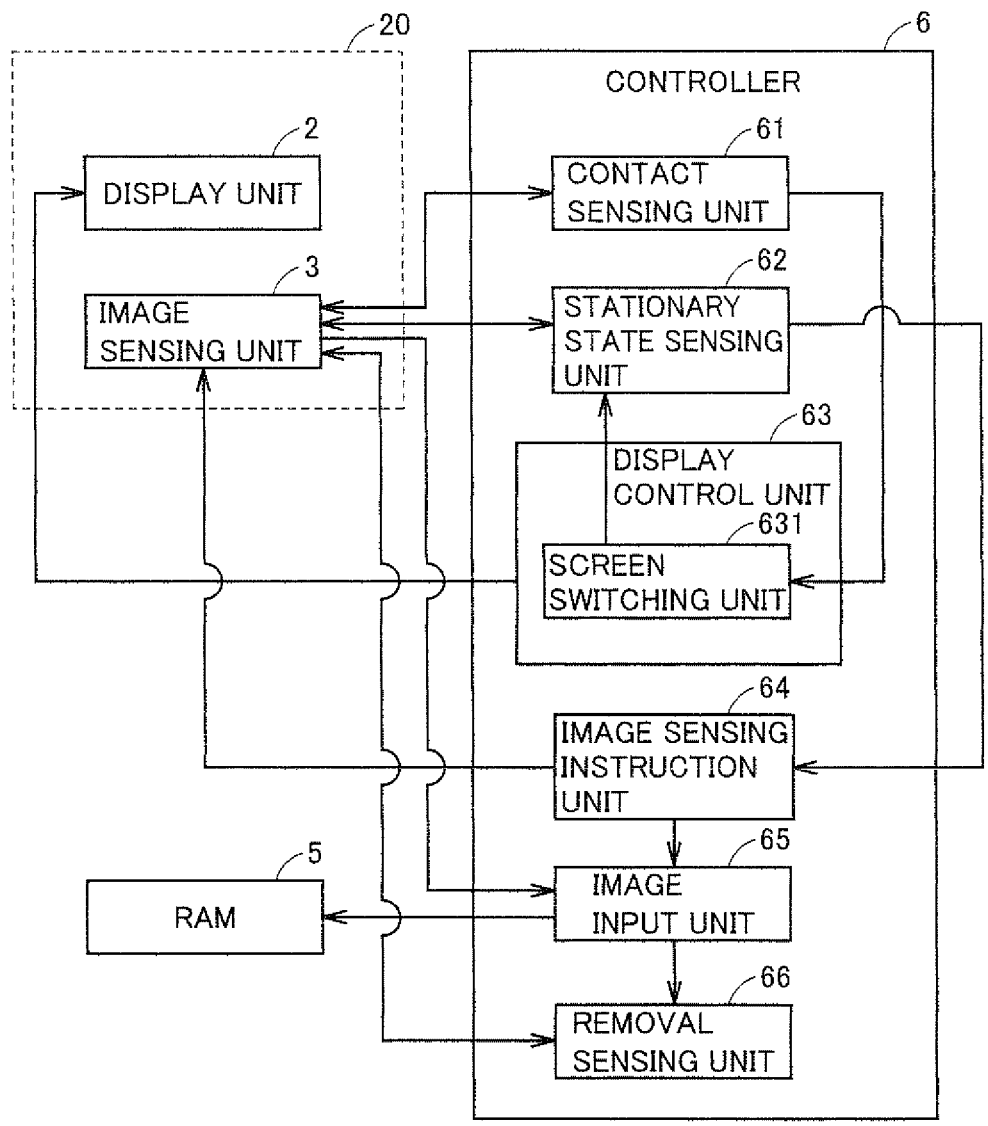
FIG. 6 shows a functional block diagram of the image input device according to the first embodiment of the present technology.

FIG. 6 shows a functional block diagram of image input device 1 according to this embodiment.

Referring to FIG. 6, controller 6 is provided with a contact sensing unit 61, a stationary state sensing unit 62, a display control unit 63, an image sensing instruction unit 64, an image input unit 65, and a removal sensing unit 66. It should be noted that operations of these blocks can be implemented by executing software stored in ROM 5, or at least one of these blocks can be implemented by hardware.

Contact sensing unit 61 senses a contact of the document with display unit 2. Stationary state sensing unit 62 senses (determines) whether or not the document is in a stationary state, when the contact of the document has been sensed by contact sensing unit 61.

Display control unit 63 controls to display an image with an even and specific color, for example, white, at least when the contact of the document is sensed by contact sensing unit 61. As will be described later, display control unit 63 displays a message instructing to place the document on display unit 2 when an image input (image capture) is instructed by the user. Then, (while the message remains displayed) at least when the contact of the document is sensed by contact sensing unit 61, a screen switching unit 631 of display control unit 63 switches the message to the white image. Further, display control unit 63 displays a button for accepting an instruction from the user in a predetermined area of display unit 2.

Image sensing instruction unit 64, when the white image is displayed, outputs an instruction for sensing the document image to image sensing unit 3. Image input unit 65 inputs the document image sensed by image sensing unit 3. The inputted document image is stored in RAM 5.

When the image is inputted by image input unit 65, removal sensing unit 66 senses (determines) whether or not the contact of the document with display unit 2 is removed based on a sensing result by contact sensing unit 61.

Controller 6 has a function to determine a contact/noncontact of an object (for example, the user's finger) with the button displayed in display unit 2, in addition to the functions of the above blocks. In an image input process, when it is determined that the contact of the document has been removed by removal sensing unit 66, the determination of the contact/noncontact is enabled. That is, after the image is inputted, the user's instruction regarding the inputted image is accepted only after removal sensing unit 66 determines that the contact of the document has been removed. In other words, while the sensing process by removal sensing unit 66 is carried out, the determination of the contact/noncontact is disabled.

In this embodiment, a case in which an image of a business card is inputted is described as an example. In this case, such as a name and mail address on the inputted image of the business card can be further recognized by controller 6. As a result of this recognition, information on the business card can be automatically registered to an address book within flash memory 7, or mail transmission or phone call can be made automatically.

It should be noted that a document image to be sensed is not limited to an image including text information such as a business card. For example, the image can be a two-dimensional code (QR code (registered trademark)). In this case, image input device 1 can read a QR code that has been sensed to access a web site through a communication I/F (not shown in the drawing). Therefore, while it is usually required to carry out operations of activating a camera, focusing on the image, and releasing a shutter, a QR code can be recognized only by placing display unit 2 over the QR code in a magazine according to image input device 1, thereby allowing an access to a web site.

Such a QR code includes an error detection code. Accordingly, when reading the QR code, it is possible to repeatedly carry out the recognition of the QR code at a time point when a white screen is displayed in display unit 2, and the process by stationary state sensing unit 62 becomes unnecessary (as it is possible to carry out the recognition repeatedly and output a decoded result when an error is no longer detected).

Figure 7:
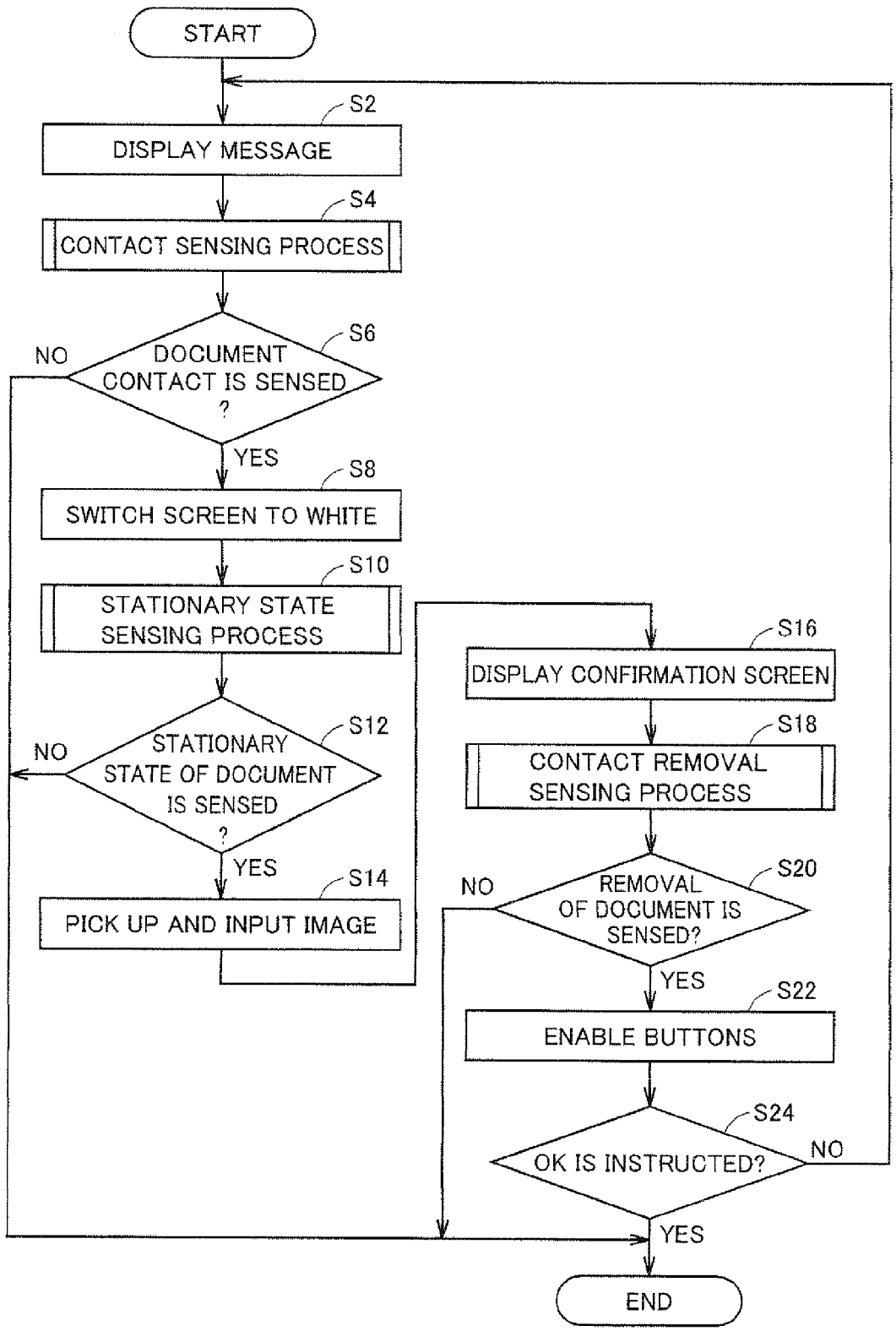
FIG. 7 shows a flow chart of a procedure of image input process of the image input device according to the first embodiment of the present technology.

FIG. 7 shows a flow chart of a procedure of the image input process of image input device 1 according to this embodiment. The process shown in the flow chart of FIG. 7 is stored in ROM 4 as a program in advance, and a function of the image input process is realized by controller 6 reading and executing the program.

Referring to FIG. 7, when the image input is requested by the user, display control unit 63 displays a message prompting placement of the document in display unit 2 (Step S (hereinafter referred to as S) 2). At this point, the button for accepting an instruction from the user is not displayed in display unit 2.

Next, contact sensing unit 61 carries out the contact sensing process for sensing the contact of the document (S4). The contact sensing process will be described in detail later with reference to a subroutine shown in FIG. 9.

After the contact sensing process, contact sensing unit 61 determines whether or not the contact of the document has been sensed (S6). If the contact of the document has been sensed (YES in S6), the message displayed in display unit 2 is switched to the white image (S8). In this manner, the image (message) displayed in display unit 2 is made invisible by a single color of white. If the contact of the document has not been sensed in S6, (NO in S6), the image input process is terminated.

When the screen is switched in S8, stationary state sensing unit 62 then carries out a stationary state sensing process (S10). The stationary state sensing process will be described in detail later with reference to a subroutine shown in FIG. 10.

After the stationary state sensing process, stationary state sensing unit 62 determines whether or not the stationary state of the document has been sensed (S12). If it is determined that the stationary state of the document has been sensed (YES in S12), image sensing instruction unit 64 outputs an image sensing instruction to image sensing unit 3. With this, (an image on) a side of the document placed on (the flat plate of) display unit 2 that is in contact with display unit 2 is sensed by image sensing unit 3. In this manner, image input unit 65 inputs the image that has been sensed and writes the image into RAM 5 (S14). It should be noted that, in this embodiment, an image is again sensed when the stationary state of the document has been sensed. However, the final image used in the stationary state sensing process in S10, that is, the image that has been sensed while the document is at the stationary state can be used as the input image, without sensing an image again.

If the stationary state of the document has not been sensed in S12 (NO in S12), the image input process is terminated.

Upon input of the image, display control unit 63 displays a confirmation screen in display unit 2 (S16). In this confirmation screen, the image that has been inputted in S14 is displayed so that the user can confirm the input image. It should be noted that the confirmation screen can be displayed as a result of character recognition of the input image by controller 6. At this time, in order to prevent an erroneous operation from occurring due to the document placed on display unit 2, operation buttons displayed on display unit 2 remain disabled. Alternatively, it is possible to make the operation buttons undisplayed at this stage. In either case, a function of a determination process for the contact/noncontact of the object in an area in which the operation buttons are displayed is disabled. The document often remains placed on display unit 2 immediately after the screen of display unit 2 is switched from the white image to the confirmation screen. Even in such a case, erroneous determination of the contact of the document as the instruction from the user can be avoided.

Next, removal sensing unit 66 carries out a contact removal sensing process (S18). The contact removal sensing process will be described in detail later with reference to a subroutine shown in FIG. 11.

After the contact removal sensing process, removal sensing unit 66 determines whether or not the document has been removed from display unit 2 (the contact of document with display unit 2 has been removed) (S20). If it is determined that the document has been removed (YES in S20), controller 6 enables the operation buttons displayed in display unit 2 (S22). It should be noted that the process in S16 can be replaced with the processes in S18 and S20, as the document is still placed on display unit 2 in S16 and the user cannot see the confirmation screen.

If the noncontact of the document has not been sensed in S20 (NO in S20), the image input process is terminated.

Finally, an instruction from the user to the operation buttons (for example, an "OK" button and a "RETRY" button) displayed in the confirmation screen is detected. If the instruction from the user is "OK" (YES in S24), the image input process is terminated. At this time, the image that has been inputted can further go through a process such as the character recognition as described above, or can be stored in flash memory 7 as the image.

On the other hand, if the instruction from the user is "RETRY" (No in S24), the process returns to S2, and the above-described series of processes are repeated again.

Figure 8:
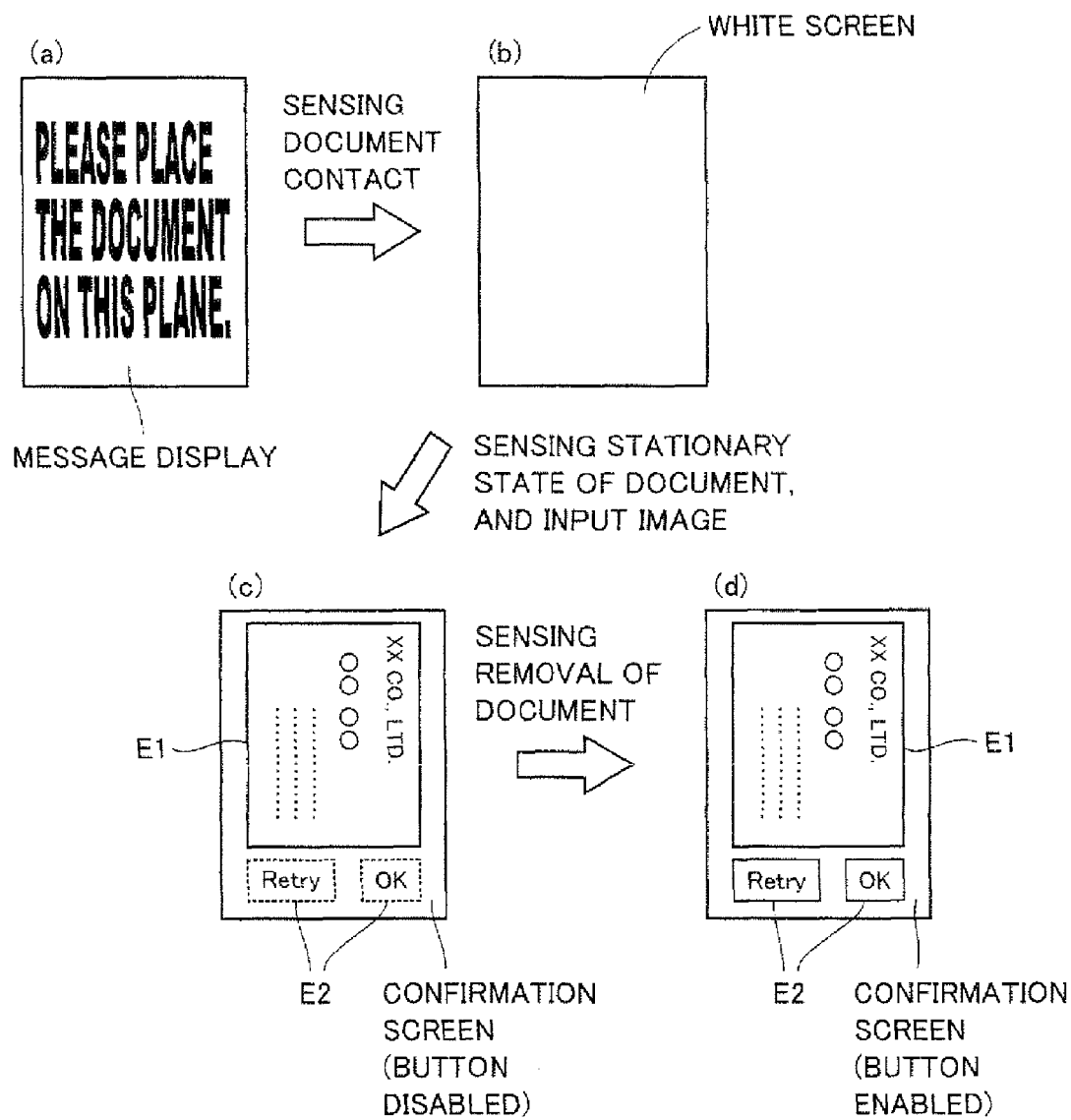
FIG. 8(a) to FIG. 8(d) show an example of transition of screens in the embodiments of the present technology.

Now, an example of the transition of the screens displayed in display unit 2 in the image input process according to this embodiment as described above is described with reference to FIG. 8. FIG. 8(*a*) to FIG. 8(*d*) show the example of the transition of the screens in this embodiment. FIG. 8(*a*) corresponds to S2, FIG. 8(*b*) corresponds to S8, FIG. 8(*c*) corresponds to S16, and FIG. 8(*d*) corresponds to S22.

In FIG. 8(*a*), a message is displayed in an entire screen of display unit 2 so that the user may not be at a loss about how to operate. Then, when the contact of the document is sensed, as shown in FIG. 8(*b*), the screen of display unit 2 is filled with white. As the document covers display unit 2 when the screen is as shown in FIG. 8(*b*), the user cannot actually see this screen.

When the stationary state of the document is sensed and the image of the document (business card) is sensed, as shown FIG. 8(*c*), the confirmation screen is displayed. At this time, the image that has been sensed is displayed in a reduced size on a predetermined scale in a predetermined area E1 of display unit 2. Further, two buttons for accepting the instructions from the user are displayed in a different predetermined area E2 of display unit 2. It should be noted that, the user cannot actually see this screen in this stage too, as the document covers display unit 2. Therefore, in order to prevent an erroneous operation from occurring due to the document brought into contact with the buttons as described above, the two displayed buttons are disabled. That is, in S18 and S20 shown in FIG. 7, the buttons remain disabled while it is sensing whether or not the contact of the document has been removed.

Subsequently, when it is determined that the document has been removed, as shown in FIG. 8(d), the two buttons also shown in FIG. 8(c) are enabled.

In this manner, an image with high quality can be automatically inputted by detecting the contact and a stationary state of the document after the user places the document on display unit 2 in FIG. 8(a). Accordingly, it is not necessary to additionally provide a hardware button for capturing an image or display a capture button on the screen of display unit 2. Therefore, according to this embodiment, it is possible to input an image with high quality in a simple manner without making the user to be at a loss or bothered about how to operate. Further, it is possible to reduce a size of image input device 1.

Moreover, as shown in FIG. 8(d), the instruction about the inputted image is accepted after it is sensed that the document has been removed from display unit 2. As controller 6 does not carry out the determination even if there is an object (for example, the document) that is brought into contact with area E2 in which the buttons are displayed by then (at the stage of FIG. 8(c)), and thus it is possible to avoid the erroneous operation.

Next, the contact sensing process, the stationary state sensing process, and the contact removal operation according to this embodiment are described in detail. In this embodiment, the processes are carried out based on the image that is sensed by image sensing unit 3. However, the processes are not limited to such an example, and it is possible to additionally provide a pressure-sensitive touch panel, for example, and the contact and the stationary state of the document can be sensed based on a degree of a pressure detected using the touch panel. In other words, image input device 1 can be further provided with a pressure sensor (not shown in the drawing) for sensing a pressure applied from outside to display unit 2, and contact sensing unit 61, stationary state sensing unit 62, and removal sensing unit 66 can carry out the respective sensing processes based on outputs from the pressure sensor.

Figure 9:
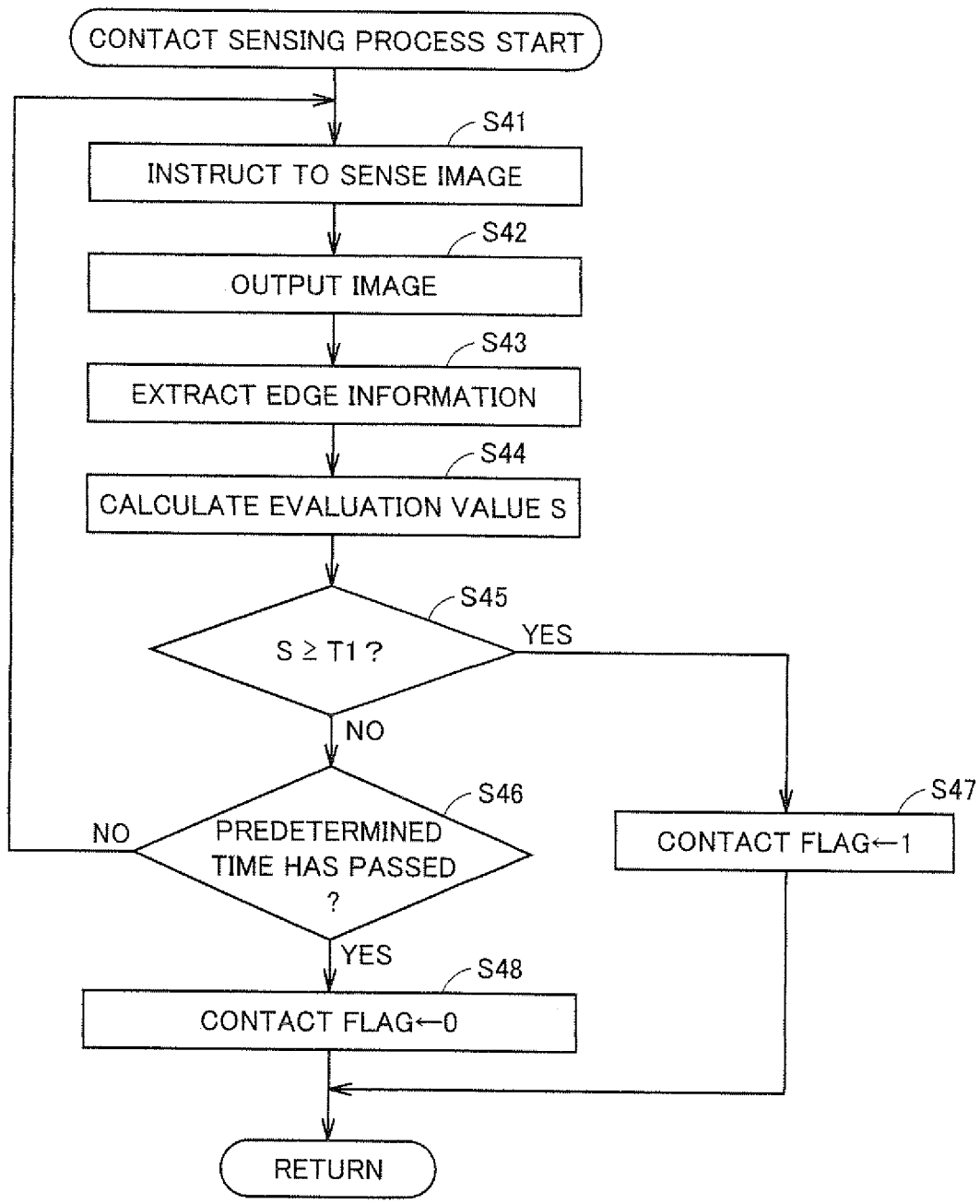
FIG. 9 shows a flow chart of a contact sensing process in the embodiments of the present technology.

FIG. 9 shows a flow chart of the contact sensing process according to this embodiment.

Referring to FIG. 9, contact sensing unit 61 outputs the image sensing instruction to image sensing unit 3 (S41). The image that has been sensed is outputted to a temporary area secured in RAM 5 (S42). Then, contact sensing unit 61 extracts edge information from the image outputted to the temporary area (S43).

Specifically, where a pixel (luminance) value is p(x, y) and the edge information is g(x, y) at a coordinate (x, y), an expression 1 can be established.

$$g(x,y)=|\Sigma f_x(i,j)p(x+i,y+j)|+|\Sigma f_y(i,j)p(x+i,y+j)| \quad \text{[Expression 1]}$$

Here, fx and fy are operators of Sobel, and have coefficients as in an expression 2.

$$f_x = \begin{bmatrix} -1 & 0 & 1 \\ -2 & 0 & 2 \\ -1 & 0 & 1 \end{bmatrix} \quad \text{[Expression 2]}$$

$$f_y = \begin{bmatrix} -1 & -2 & -1 \\ 0 & 0 & 0 \\ 1 & 2 & 1 \end{bmatrix}$$

While the operators of Sobel are used in order to obtain the edge information in this embodiment, a different type of operators can be used.

Next, contact sensing unit 61 calculates an evaluation value S based on the edge information for each pixel as shown by an expression 3 (S44).

$$S=\Sigma g(x,y) \quad \text{[Expression 3]}$$

In expression 3, evaluation value S is taken as a summation of g(x, y). However, evaluation value S can be obtained by binarizing g(x, y) by a predetermined threshold value first, and then summating. In this manner, it is possible to reduce an influence of noise.

Upon obtaining evaluation value S, a presence of the contact of the document is determined based on whether or not evaluation value S is no smaller than a predetermined threshold value T1 (S45). If evaluation value S is no smaller than threshold value T1 (YES in S45), contact sensing unit 61 sets a flag indicating the presence of the contact of the document (hereinafter "contact flag") to 1 (S47). That is, it is determined that the contact of the document has been sensed. Upon completion of the process in S47, the process returns to the main routine.

If evaluation value S is smaller than threshold value T1 (NO in S45), contact sensing unit 61 determines whether or not a predetermined time has passed (S46). The above processes are repeated until it is determined that the predetermined time has passed (NO in S46). In this embodiment, the image sensing instruction is outputted (S41) on a predetermined cycle (for example, 30 Hz).

If it is determined that the predetermined time has passed in S46 (YES in S46), contact sensing unit 61 sets the contact flag to 0 (S48). That is, it is determined that the contact of the document has not been sensed. Upon completion of the process in S48, the process returns to the main routine.

As the contact of the document is sensed in this manner in this embodiment, the process in S6 in FIG. 7 is specifically carried out by determining whether the contact flag is 0 or 1. That is, the process proceeds to S8 if the contact flag is 1, and is terminated if the contact flag is 0.

It should be noted that the message shown in S2 in FIG. 7 (FIG. 8(a)) is preferable to be an image whose variation in brightness is large. This makes the message be overlapped when the document is placed, and therefore facilitates the detection of the contact. For example, when the message is shown in white characters on a blue background, it is difficult to detect the contact of a business card that is mostly in white. As a solution, shading the white characters in black and making the characters overlapped with the image that has been sensed facilitates the detection of the contact of the business card that is mostly in white. Specifically, while evaluation value S is about 6 in the former case, evaluation value S increases up to 140 in the latter case.

Further, the contact detection is carried out while the message is being displayed in this embodiment, the message in S2 is assumed to be a still image, such as characters and/or symbols. Therefore, after the stationary state of the document is sensed the screen can be switched to an even and specific color. That is, in FIG. 7, the process in S8 can be carried out between S12 and S14.

Figure 10:
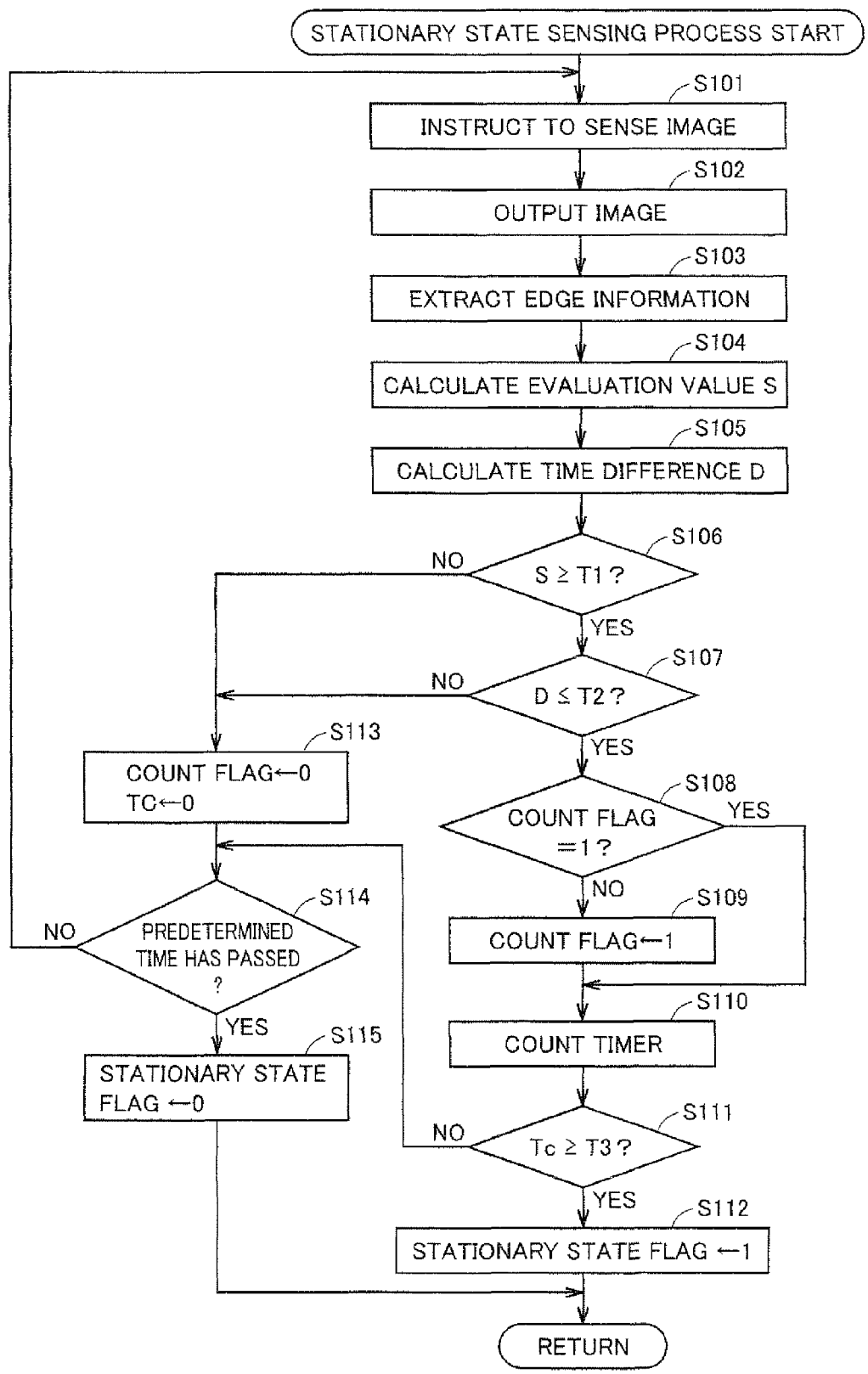
FIG. 10 shows a flow chart of a stationary state sensing process in the embodiments of the present technology.

FIG. 10 shows a flow chart of the stationary state sensing process in this embodiment. It should be noted that processes in S101 to S104 in FIG. 10 are respectively the same as the processes in S41 to S44 in FIG. 9. Therefore, the descriptions for these steps will not be repeated here.

Referring to FIG. 10, stationary state sensing unit 62 calculates a time difference D of the image in S105. In this embodiment, the stationary state of the document is determined using time difference D. Time difference D is obtained by an expression 4.

$$D=\Sigma|g(x,y)-g'(x,y)| \quad \text{[Expression 4]}$$

where, g' is the edge information of a previous frame. It should be noted that, similarly to expression 3, time difference D can be obtained by first binarizing the edge information by the predetermined threshold value. Alternatively, the time difference can be obtained using a luminance value, instead of the edge information.

Next, stationary state sensing unit 62 determines whether or not evaluation value S is no smaller than threshold value T1 (S106). If evaluation value S is no smaller than threshold value T1 (YES in S106), it is further determined whether nor not time difference D is no greater than a predetermined threshold value T2 (S107). If time difference D is no greater than threshold value T2 (YES in S107), the process proceeds to S108. On the other hand, if evaluation value S is smaller than threshold value T1 or time difference D is greater than threshold value T2 (NO in S106 and NO in S107), the process proceeds to S113.

In S108, stationary state sensing unit 62 determines whether or not a flag indicating whether a rest time Tc is counted or not (hereinafter "count flag") is set to 1. If the count flag is not 1 (NO in S108), the count flag is set to 1 (S109), and the process proceeds to S110. If the count flag is 1 (YES in S108), then the process proceeds to S110, skipping S109.

In S 110, stationary state sensing unit 62 counts time Tc after the stationary state of the document has been sensed. Then, it is determined whether or not time Tc is no smaller than predetermined time T3 (S111). If time Tc is no smaller than predetermined time T3 (YES in S111), stationary state sensing unit 62 sets a flag indicating whether or not the document is at the stationary state (hereinafter "stationary state flag") to 1 (S116). That is, it is determined that the document is at the stationary state. Upon completion of the process in S116, the process returns to the main routine.

In S113, stationary state sensing unit 62 sets the count flag and time Tc that is a counting value of the timer to 0. Then, it is determined whether or not the predetermined time has passed since the stationary state sensing process started (S114). The process returns to S101 until it is determined that the predetermined time has passed (NO in S114) and the stationary state sensing process continues. Also in the stationary state sensing process, the image sensing instruction can be outputted on a predetermined cycle (for example, 30 Hz).

In S114, if it is determined that the predetermined time has passed (YES in S114), stationary state sensing unit 62 sets the stationary state flag to 0 (S115). That is, it is determined that the stationary state of the document is not sensed. Upon completion of the process in S115, the process returns to the main routine.

As whether or not the document is at the stationary state is sensed in this manner in this embodiment, the process in S12 in FIG. 7 is carried out by determining whether the stationary state flag is 0 or 1 to be more precise. That is, the process proceeds to S14 if the stationary state flag is 1, and is terminated if the stationary state flag is 0.

Figure 11:
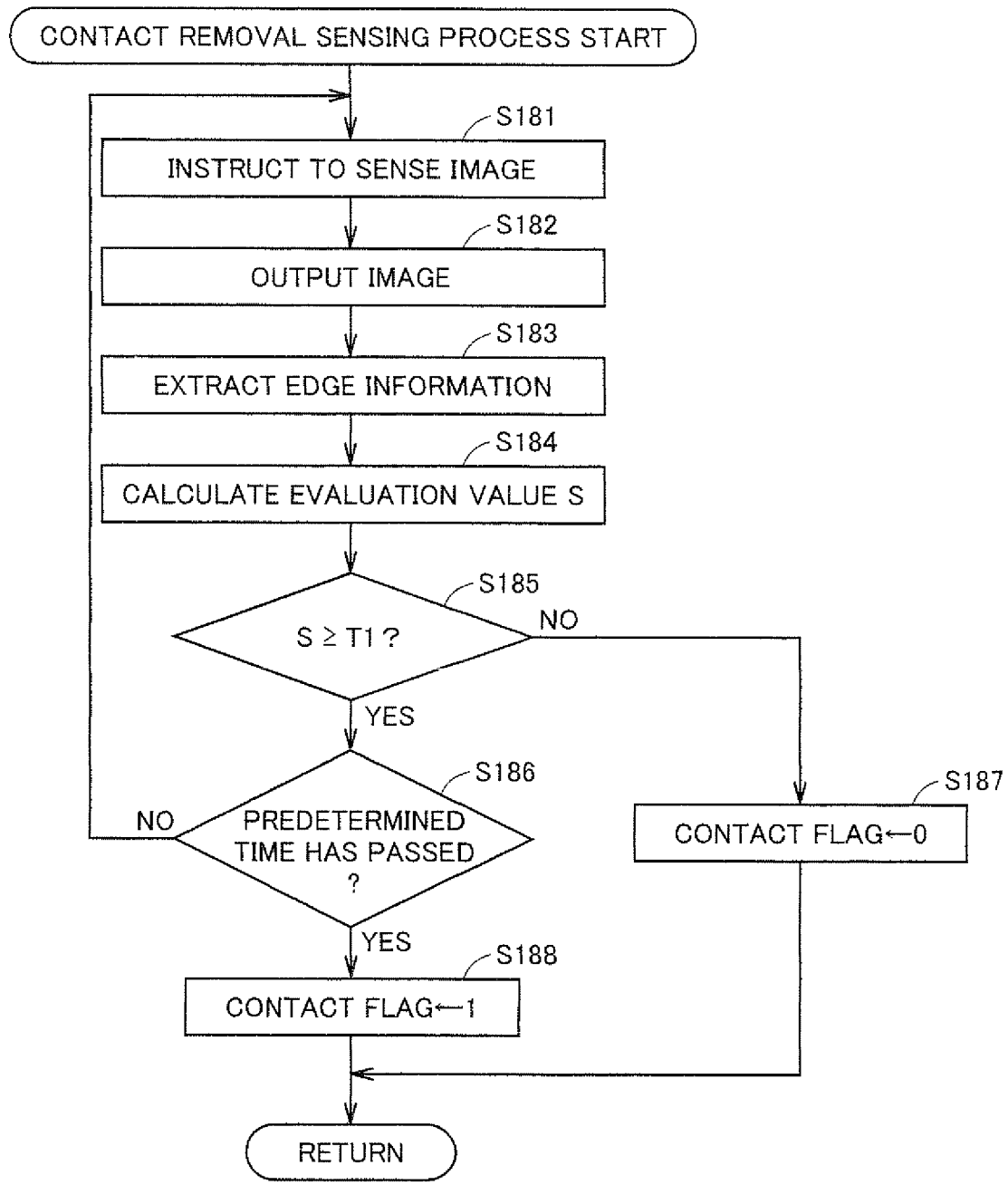
FIG. 11 shows a flow chart of a contact removal sensing process in the embodiments of the present technology.

FIG. 11 shows a flow chart of the contact removal sensing process in this embodiment. The processes in S181 to S185 in FIG. 11 are respectively the same as the processes in S41 to S45 in FIG. 9. Therefore, the descriptions for these steps will not be repeated here.

In S185, if evaluation value S is no smaller than threshold value T1 (YES in S185), removal sensing unit 66 determines whether or not the predetermined time has passed (S186). The above processes are repeated until it is determined that the predetermined time has passed (NO in S186).

If evaluation value S is smaller than threshold value T1 (NO in S185), removal sensing unit 66 sets the contact flag to 0 (S187). That is, it is determined that the contact of the document is removed. Upon completion of the process in S187, the process returns to the main routine.

In S186, if it is determined that the predetermined time has passed (YES in S186), removal sensing unit 66 sets the contact flag to 1 (S188). That is, it is determined that the document remains in contact (the document has not been removed). Upon completion of the process in S188, the process returns to the main routine.

As whether or not the document has been removed from display unit 2 is sensed in this manner in this embodiment, the process in S20 in FIG. 7 is carried out by determining whether the contact flag is 0 or 1 to be more precise. That is, the process proceeds to S22 if the contact flag is 0, and is terminated if the contact flag is 1.

It should be noted that a predetermined time-out period in each of the processes as described above can be the same value or a different value for each process.

Figure 12:
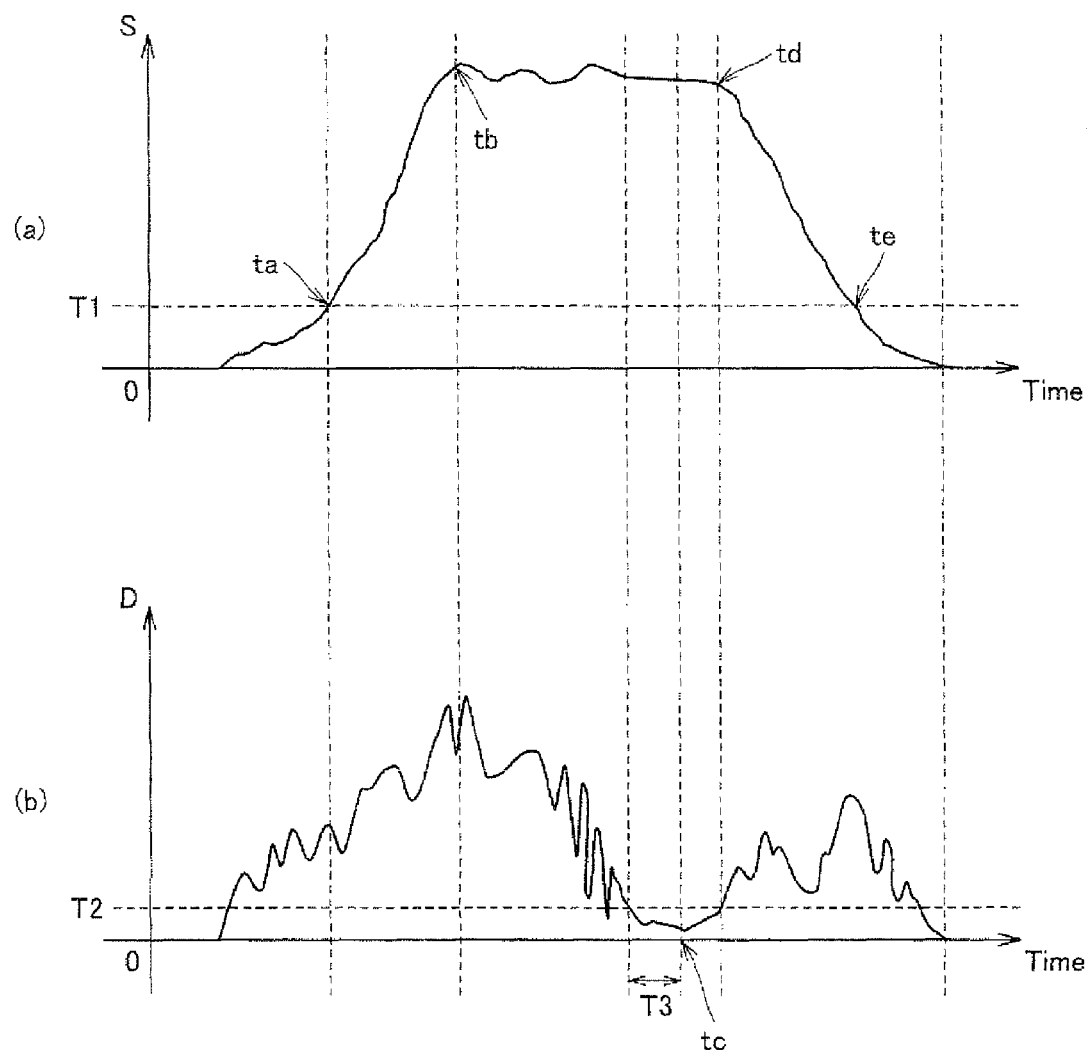
FIG. 12(a) and FIG. 12(b) respectively show examples of fluctuations in an evaluation value S and a time difference D used for sensing a contact and a stationary state of a document.

FIG. 12(a) and FIG. 12(b) respectively show examples of fluctuations in evaluation value S and time difference D used for sensing the contact and the stationary state of the document.

Referring to FIG. 12(a), when evaluation value S is no smaller than threshold value T1 (ta), the contact of the document is sensed. Then, evaluation value S increases as a contacting area of the document increases, and when the document is completely placed on display unit 2 (tb), evaluation value S stabilizes.

Referring to FIG. 12(b), time difference D remains large while the user moves the document for positioning even after the document is placed on display unit 2, and time difference D becomes small once the user stops moving the document. Accordingly, at a time point (tc) at which predetermined time T3 has passed since time difference D became no greater than threshold value T2, the stationary state of the document is detected. It is preferable that predetermined time T3 is in a range of about 500 ms to 1000 ms. It should be noted that threshold values T1 and T2 can be set before shipment based on quality of an image to be sensed by image sensing unit 3.

Referring again to FIG. 12(a), when removing the document (td), evaluation value S gradually decreases. At a time point (te) at which evaluation value S becomes smaller than threshold value T1, it is sensed that there is no document.

It should be noted that, when the user manually removes the document, the document is not necessarily removed evenly and the user most likely removes the document by lifting a part of the document. Accordingly, in many cases, the document image is actually still being sensed in a periphery area even after evaluation value S has decreased. Therefore, it can be determined that there is no document after a predetermined time (for example, 500 ms) has passed since evaluation value S was sensed to be smaller than threshold value T1.

As described above, according to this embodiment, the contact of the document is waited while the message is displayed to the user, and the screen is automatically filled with the even white color after the contact is sensed. In this manner, the user may not be at a loss about how to operate, and it is possible to input an image without being overlapped with the displayed message. Further, by capturing the image after the stationary state of the document is automatically sensed, an image without a blur can be inputted without the user pressing the capture start button. Moreover, by disabling the buttons while the contact of the document is sensed, it is possible to prevent the erroneous operation from occurring due to the contact of the document with display unit 2.

In this embodiment, as described above, the displayed message is switched to the image of the even and specific color when the contact of the document is sensed. However, the present technology is not limited to such a technique, and the screen can be switched to the even and specific color at a time point, for example, at which a predetermined time (for example, 3 seconds) has passed since the message was displayed.

It should be noted that each of the above expressions 1, 3, and 4 can be a value obtained by multiplying a predetermined coefficient according to a bit number used in the calculation. For example, expression 1 can be an expression like an expression 5.

$$g(x,y)=(|\Sigma f_x(i,j)p(x+i,y+j)|+|\Sigma f_y(i,j)p(x+i,y+j)|)/4 \quad \text{[Expression 5]}$$

Also at this time, g(x, y) can be processed by binarizing by a threshold value of 40. This threshold value is determined based on a degree of a blur of the image that can be sensed.

Moreover, expression 3 can be normalized by dividing by a pixel number and multiplying by 1000, as shown by an expression 6, so that the size of the image is not influenced and the value becomes an integer number.

$$S = \frac{\sum g(x, y)}{\text{pixel number}} \times 1000 \quad \text{[Expression 6]}$$

In the above condition, threshold value T1 can be set to about 70.

Further, expression 4 can be normalized by dividing by a pixel number and multiplying by 1000, as shown by an expression 7.

$$D = \frac{\sum |g(x, y) - g'(x, y)|}{\text{pixel number}} \times 1000 \quad \text{[Expression 7]}$$

At this time, threshold value T2 can be set to about 5.

Second Embodiment

The following describes the image input device according to the second embodiment.

In the first embodiment, it is described that the even specific color is one color (for example, white) that is to be displayed in display unit 2 when sensing the image to be inputted. Accordingly, the image can be inputted with a single image sensor when it is determined that the document is at the stationary state. However, in a case in which image sensing 3 is a device that can sense only an image in black and white, it is not possible to input a color image using the control method according to the first embodiment. The second embodiment describes an image input device capable of inputting a color image even with such a device that can only sense a black-and-white image.

It should be noted that the image input device according to this embodiment has the same hardware configuration and appearance as image input device 1 according to the first embodiment, and basic operations of the devices are also the same. Accordingly, the device of this embodiment is also described as image input device 1 shown in FIG. 1 to FIG. 3.

The following describes differences from the first embodiment.

In this embodiment, in order to input a color image, the even and specific color includes even three colors. Specifically, the specific color includes three colors of red, green, and blue. Note that the three colors are not limited to these colors, and can be, for example, three colors of cyan, magenta, and yellow.

Figure 13:
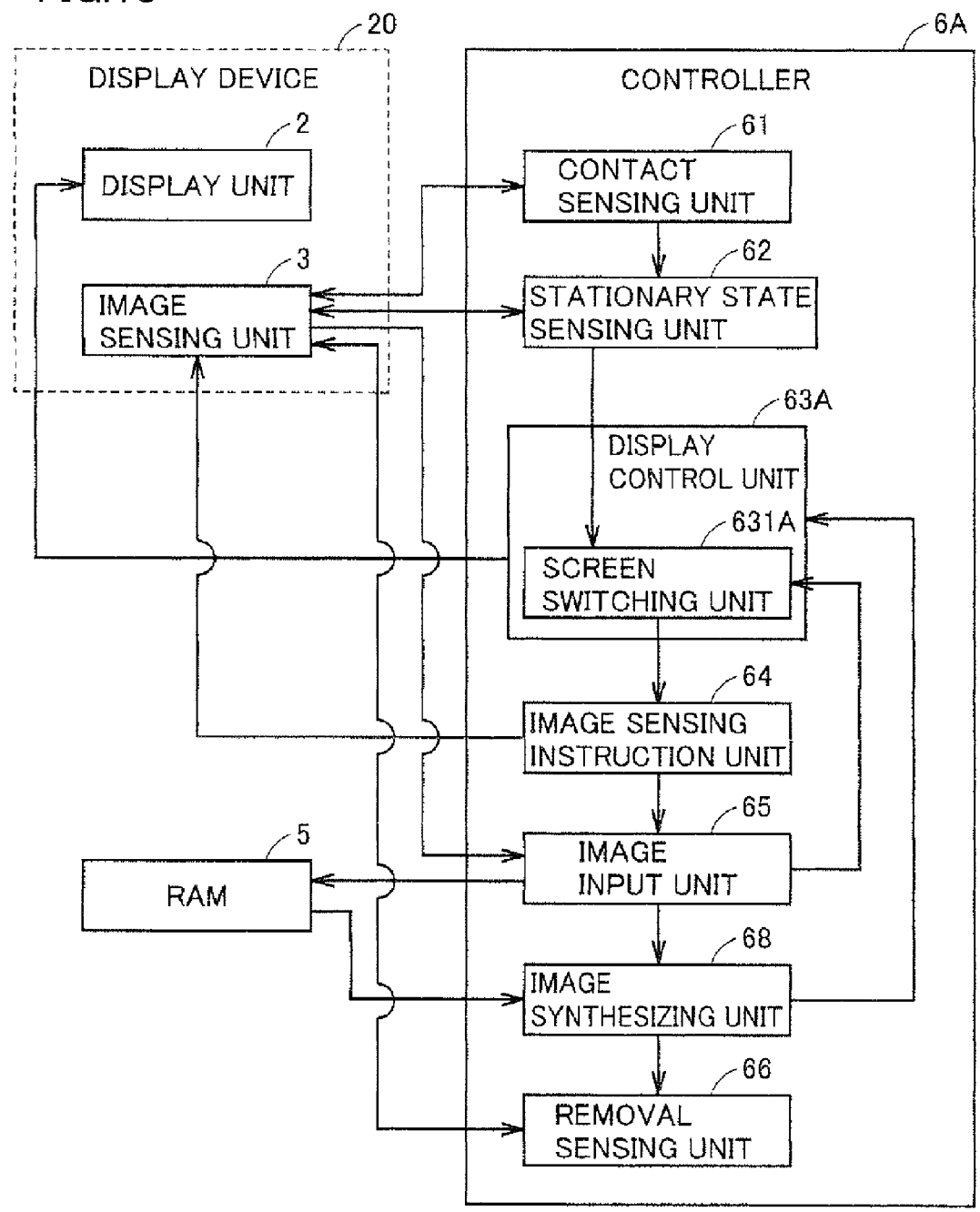
FIG. 13 shows a functional block diagram of the image input device according to the second embodiment of the present technology.

FIG. 13 shows a functional block diagram of image input device 1 according to this embodiment. Compared to the functional block diagram shown in FIG. 6, the function of controller 6 is different, and therefore the controller in this embodiment is indicated as a controller 6A.

Controller 6A is provided with contact sensing unit 61, stationary state sensing unit 62, a display control unit 63A, image sensing instruction unit 64, image input unit 65, and removal sensing unit 66, and further provided with an image synthesizing unit 68. Note that display control unit 63 and screen switching unit 631 included therein are also indicated as display control unit 63A and a screen switching unit 631A in order to distinguish from the first embodiment.

Operations of these blocks are described referring to the flow chart as follows.

Figure 14:
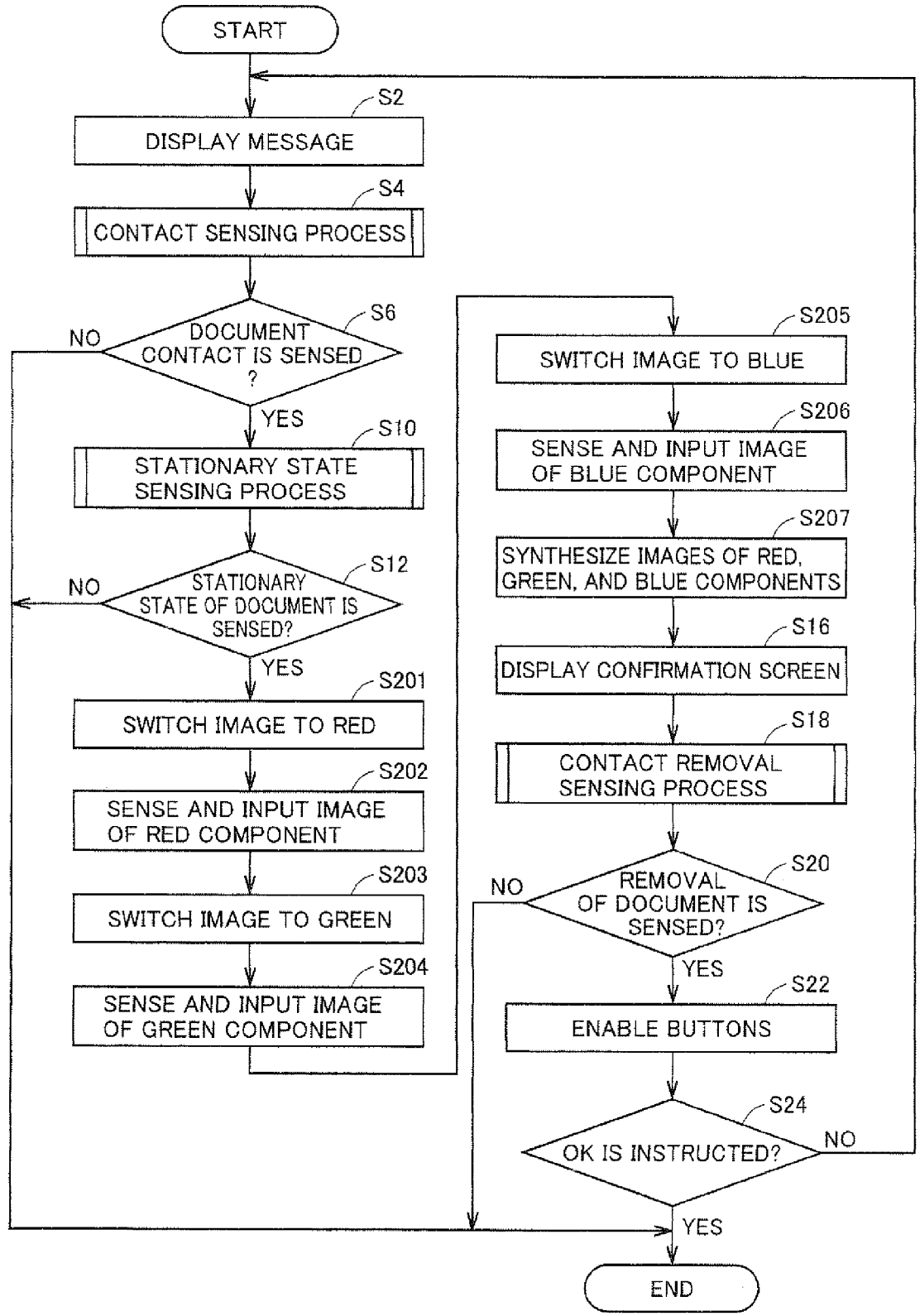
FIG. 14 shows a flow chart of a procedure of image input process of the image input device according to the second embodiment of the present technology.

FIG. 14 shows a flow chart of a procedure of the image input process of image input device 1 according to this embodiment. The process shown in the flow chart of FIG. 14 is stored in ROM 4 as a program in advance, and the function of image input process is realized by controller 6 reading and executing this program. It should be noted that processes that are the same as the processes shown in the flow chart in FIG. 7 are assigned with the same step numbers. Therefore, the descriptions for these steps will not be repeated here.

Referring to FIG. 14, in the second embodiment, the processes in S8 (switching the screen to white) and S14 (sensing and inputting the image) in the image input process of the first embodiment shown in FIG. 7 are different. In place of these processes, processes in S201 to 207 are carried out between S12 (determining whether or not the document is at the stationary state) and S16 (displaying confirmation screen).

In S201, screen switching unit 631A of display control unit 63A switches the message displayed in display unit 2 to an even red image. In this manner, the image (message) displayed in display unit 2 is filled with all red. Then, image sensing instruction unit 64 outputs the image sensing instruction to image sensing unit 3. With this, an image of a red component on a surface which is in contact with display unit 2 of the document placed on display unit 2 is sensed (S202). The image that has been sensed is temporarily recorded in a predetermined area in RAM 5 by image input unit 65.

Next, screen switching unit 631A switches the red image displayed in display unit 2 to an even green image (S203). In this manner, the image (red image) displayed in display unit 2 is filled with all green. Then, image sensing instruction unit 64 outputs the image sensing instruction to image sensing unit 3. With this, an image of a green component on a surface which is in contact with display unit 2 of the document placed on display unit 2 is sensed (S204). The image that has been sensed is temporarily recorded in a predetermined area in RAM 5 by image input unit 65.

Subsequently, screen switching unit 631A switches the green image displayed in display unit 2 to an even blue image (S205). In this manner, the image (green image) displayed in display unit 2 is filled with all blue. Then, image sensing instruction unit 64 outputs the image sensing instruction to image sensing unit 3. With this, an image of a blue component on a surface which is in contact with display unit 2 of the document placed on display unit 2 is sensed (S206). The image that has been sensed is temporarily recorded in a predetermined area in RAM 5 by image input unit 65.

Thereafter, image synthesizing unit 68 synthesizes the images of the red, green, and blue components that have been sensed (S207). In this manner, the color image can be obtained.

As described above, according to this embodiment, by switching the image displayed in display unit 2 to red, green, and blue, and by inputting and synthesizing the respective images, it is possible to input the color image by providing optical sensor 30 only to a single sub-pixel without providing optical sensor 30 for each of three sub-pixels.

It should be noted that in the flow chart of FIG. 14, at the time point at which the contact of the document is sensed, the document stationary state sensing process is subsequently carried out without switching the screen to the even specific color. However, similarly to the first embodiment, the screen can be switched to all red at the time point at which the contact of the document is sensed, and the document stationary state sensing process can be carried out in this state. In this case, a process of S201 is carried out between S6 and S10.

Moreover, while the screen is switched in the order of red, green, and blue in this embodiment, the present technology is not limited to such an order.

Modified Example

It should be noted that the configuration of display and image sensing device 20 is not limited to the configurations as shown in FIG. 3 and FIG. 4. For example, a configuration as described in "A 2.6 inch VGA LCD with Optical Input Function using a 1-Transistor Active-Pixel Sensor" (Hiromi KATO, Chris BROWN, and Ben HADWEN, Sharp Technical Journal, No. 96, November 2007). Alternatively, the following configuration can be used.

Figure 16:
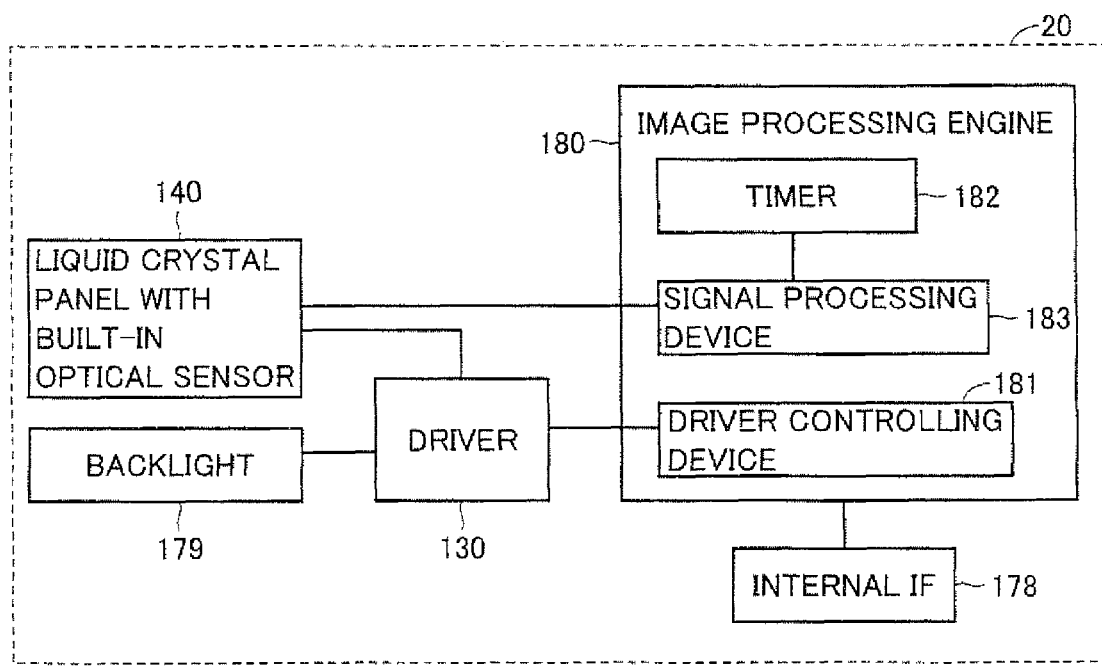
FIG. 16 shows a diagram illustrating one example of a hardware configuration of the display and image sensing device according to a modified example of the embodiments of the present technology.

FIG. 16 shows one example of the hardware configuration of display and image sensing device 20.

Referring to FIG. 16, display and image sensing device 20 is more specifically provided with, for example, a driver 130, a liquid crystal panel with a built-in optical sensor (hereinafter referred to as a "liquid crystal panel") 140, an internal IF 178, a backlight 179, and an image processing engine 180.

Driver 130 is a drive circuit for driving liquid crystal panel 140 and backlight 179. Various drive circuits included in driver 130 will be described later.

Liquid crystal panel 140 is a device provided with a function of a liquid crystal display and a function of an optical sensor. That is, liquid crystal panel 140 can display an image using the liquid crystal and carry out the sensing using the optical sensor.

Internal IF (Interface) 178 mediates data communication with the components other than display and image sensing device 20.

Backlight 179 is a light source disposed on a back surface of liquid crystal panel 140. Backlight 179 irradiates the back surface with even light.

Image processing engine 180 controls an operation of liquid crystal panel 140 using driver 130. Here, this control is carried out based on various types of data transmitted from controller 6 via internal IF 178. Further, image processing engine 180 processes data outputted from liquid crystal panel 140 and transmits the processed data to controller 6 via internal IF 178. Moreover, image processing engine 180 includes, for example, a driver controlling device 181, a timer 182, and a signal processing device 183.

Driver controlling device 181 controls an operation of driver 130 by transmitting a control signal to driver 130. Timer 182 generates time information and transmits the time information to signal processing device 183. Signal processing device 183 receives data outputted from the optical sensor. Here, as the data outputted from the optical sensor is analog data, signal processing device 183 first converts the analog data to digital data. Further, signal processing device 183 carries out data processing to the digital data according to content of a command transmitted from controller 6. Then, signal processing device 183 transmits the data after the data processing and data including the time information obtained from timer 182 to controller 6. Moreover, signal processing device 183 can be provided with RAM (not shown in the drawing) capable of successively storing a plurality pieces of scanning data.

In this example, display and image sensing device 20 is configured using a system LCD. The system LCD is a device realized by integrally forming peripheral devices of liquid crystal panel 140 on a glass substrate of the liquid crystal panel. In this embodiment, driver 130 (excluding the circuit for driving backlight 179), internal IF 178, and image processing engine 180 are integrally formed on the glass substrate of liquid crystal panel 140. It should be noted that display and image sensing device 20 is not necessarily be configured using the system LCD, and driver 130 (excluding the circuit for driving backlight 179), internal IF 178, and image processing engine 180, can be formed on a substrate other than the glass substrate.

Figure 17:
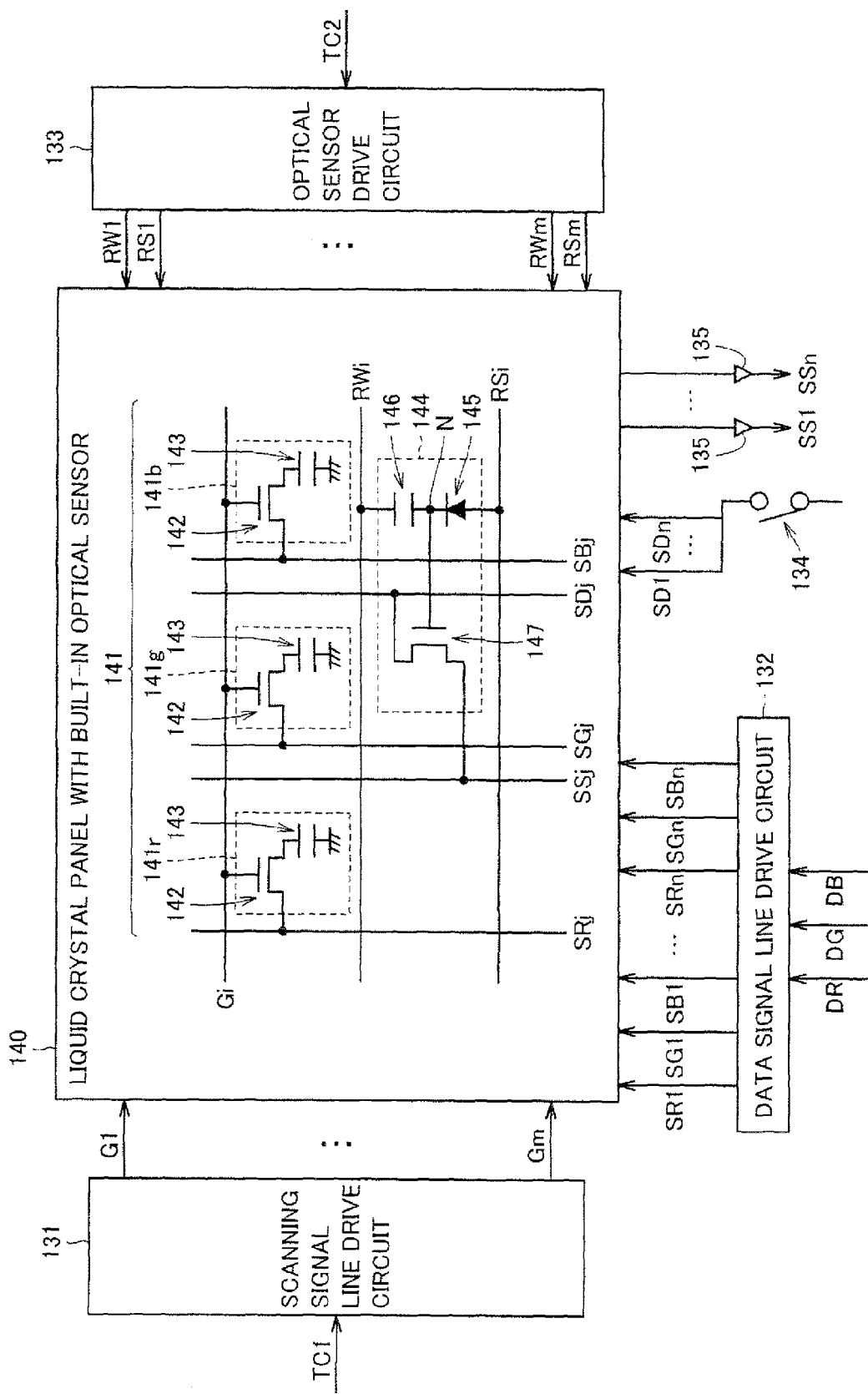
FIG. 17 shows a diagram illustrating a configuration of a liquid crystal panel with a built-in optical sensor and peripheral circuits of this liquid crystal panel according to the modified example of the embodiments of the present technology.

FIG. 17 shows a diagram illustrating a configuration of liquid crystal panel 140 and peripheral circuits of liquid crystal panel 140.

Referring to FIG. 17, liquid crystal panel 140 includes pixel circuits 141, an optical sensor circuit 144, a scanning signal line Gi, a data signal line SRj, a data signal line SGj, a data signal line SBj, a sensor signal line SSj, a sensor signal line SDj, a reading signal line RWi, and a resetting signal line RSi. Note that i is a natural number satisfying $1 \leq i \leq m$, and j is a natural number satisfying $1 \leq j \leq n$.

Further, driver 130 includes, as the peripheral circuits of liquid crystal panel 140, a scanning signal line drive circuit 131, a data signal line drive circuit 132, an optical sensor drive circuit 133, a switch 134, and an amplifier 135.

Scanning signal line drive circuit 131 receives a control signal TC1 from driver controlling device 181. Then, scanning signal line drive circuit 131 applies a predetermined voltage to each scanning signal line (G1 to Gm) sequentially from scanning signal line G1 based on control signal TC1. More specifically, scanning signal line drive circuit 131 sequentially selects one of the scanning signal lines (G1 to Gm) every unit time, and applies a voltage that is sufficient to turn on a gate of a TFT (Thin Film Transistor) 142 (hereinafter referred to as a high-level voltage), as will be described later, to the selected scanning signal line. Note that the scanning signal lines that have not been selected remain being applied with a low-level voltage instead of the high-level voltage.

Data signal line drive circuit 132 receives image data (DR, DG, and DB) from driver controlling device 181. Then, data signal line drive circuit 132 sequentially applies a voltage that corresponds to image data of a single line to 3n data signal lines (SR1 to SRn, SG1 to SGn, and SB1 to SBn) every unit time.

It should be noted that while the description is given herein using a driving method what is called a line-sequential system, the present technology is not limited to this method.

Each pixel circuit 141 is a circuit for setting luminance (transmissivity) for a single pixel. Further, m×n number of pixel circuits 141 are disposed in matrix. More specifically, m pixel circuits 141 are disposed along a longitudinal direction of FIG. 16, and n pixel circuits 141 are disposed along a lateral direction of FIG. 16.

Pixel circuit 141 includes an R sub-pixel circuit 141r, a G sub-pixel circuit 141g, and a B sub-pixel circuit 141b. These three circuits (141r, 141g, and 141b) each include TFT 142, a pair of electrode pair 143 of a pixel electrode and an opposite electrode, and a capacitor that is not shown.

It should be noted that a polycrystal silicon thin film transistor (p-Si TFT) is used as TFT 142 for display and image sensing device 20 because it is possible to be implemented as CMOS (Complementary Metal Oxide Semiconductor) that can form an n-type transistor and a p-type transistor, a traveling speed of a carrier (electron or hole) of p-Si TFT is several hundred times faster than that of amorphous silicon thin film transistor (a-Si TFT). It should be noted that TFT 142 is described as a field-effect transistor of an n-type channel. However, TFT 142 can be a field-effect transistor of a p-type channel.

A source of TFT 142 in R sub-pixel circuit 141r is connected to data signal line SRj. Further, a gate of TFT 142 is connected to scanning signal line Gi. Moreover, drain of TFT 142 is connected to the pixel electrode of electrode pair 143. Then, the liquid crystals are provided between the pixel electrode and the opposite electrode. It should be noted that G sub-pixel circuit 141g and B sub-pixel circuit 141b also have the same configuration as pixel circuit 141r other than that a data signal line to which a source of each TFT 142 is connected. Therefore, the descriptions for these two circuits (141g and 141b) will not be repeated here.

The following describes the setting of the luminance with pixel circuit 141. First, the high-level voltage is applied to scanning signal line Gi. By the application of the high-level voltage, the gate of TFT 142 is turned on. While the gate of TFT 142 is turned on in this manner, a specified voltage that is correspondingly specified (the voltage corresponding to the image data for a single pixel) is applied to each data signal line (SRj, SGj, and SBj). With this, a voltage based on the specified voltage is applied to the pixel electrode. As a result, a potential difference is generated between the pixel electrode and the opposite electrode. The liquid crystals respond based on the potential difference, and the luminance for the pixel is set to predetermined luminance. It should be noted that the potential difference is retained until scanning signal line Gi is selected in the next frame period by the capacitor (auxiliary capacitance) that is not shown.

Optical sensor drive circuit 133 receives a control signal TC2 from driver controlling device 181.

Then, optical sensor drive circuit 133 sequentially selects one of the resetting signal lines (RS1 to RSm) every unit time based on control signal TC2, and applies a voltage VDDR that is higher than a normal condition at a predetermined timing to the selected signal line. Note that the resetting signal lines that have not been selected remain being applied with a voltage VSSR that is lower than the voltage applied to the selected resetting signal line. For example, it is possible to set voltage VDDR to 0 V and voltage VSSR to −5 V.

Further, optical sensor drive circuit 133 sequentially selects one of the reading signal lines (RW1 to RWm) every unit time based on control signal TC2, and applies a voltage VDD that is higher than a normal condition at a predetermined timing to the selected signal line. Note that the resetting signal lines that have not been selected remain being applied with voltage VSSR. For example, it is possible to set voltage VDD to 8 V.

The timings at which voltage VDDR and voltage VDD are applied will be described later.

Optical sensor circuit 144 includes a photodiode 145, a capacitor 146, and a TFT 147. It should be noted that TFT 147 is described as a field-effect transistor of an n-type channel. However, TFT 147 can be a field-effect transistor of a p-type channel.

An anode of photodiode 145 is connected to resetting signal line RSi. On the other hand, a cathode of photodiode 145 is connected to one electrode of capacitor 146. Further, the other electrode of capacitor 146 is connected to reading signal line RWi. In the following, a connecting point between photodiode 145 and capacitor 146 is referred to as a node N.

A gate of TFT 147 is connected to node N. Further, a drain of TFT 147 is connected to sensor signal line SDj. Moreover, a source of TFT 147 is connected to sensor signal line SSj.

Switch 134 is a switch provided for switching whether or not the predetermined voltage is applied to sensor signal lines (SD1 to SDn). A switching operation of switch 134 is carried out by optical sensor drive circuit 133.

Amplifier 135 amplifies the voltages respectively outputted from sensor signal lines (SS1 to SSn). The amplified voltages are transmitted to signal processing device 183.

It should be noted that the timing at which the image is displayed in liquid crystal panel 140 using pixel circuit 141 and the timing at which the sensing is carried out using optical sensor circuit 144 are controlled by image processing engine 180.

Figure 18:
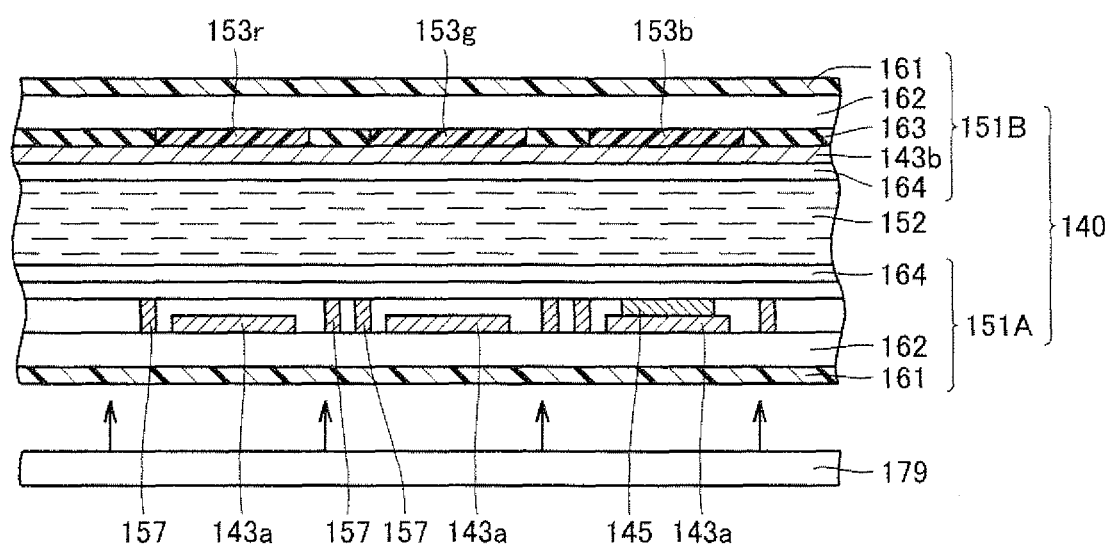
FIG. 18 shows a cross-sectional view of the liquid crystal panel with a built-in optical sensor and a backlight according to the modified example of the embodiments of the present technology.

FIG. 18 shows a cross-sectional view of liquid crystal panel 140 and backlight 179. Referring to FIG. 18, liquid crystal panel 140 includes an active matrix substrate 151A, an opposite substrate 151B, and a liquid crystal layer 152. Opposite substrate 151B is disposed so as to face toward active matrix substrate 151A. Liquid crystal layer 152 is sandwiched between active matrix substrate 151A and opposite substrate 151B. Backlight 179 is disposed facing away from liquid crystal layer 152 with respect to active matrix substrate 151A.

Active matrix substrate 151A includes a polarization filter 161 as a transparent flat plate, a glass substrate 162, a pixel electrode 143a that configures electrode pair 143, photodiode 145, a data signal line 157, and an oriented film 164. Further, while not shown in FIG. 18, active matrix substrate 151A includes capacitor 146, TFT 147, TFT 142, and scanning signal line Gi as shown in FIG. 17.

Moreover, in active matrix substrate 151A, polarization filter 161, glass substrate 162, pixel electrode 143a, and oriented film 164 are disposed in the stated order from a side of backlight 179. Photodiode 145 and data signal line 157 are formed on a side of liquid crystal layer 152 of glass substrate 162.

Opposite substrate 151B includes polarization filter 161, glass substrate 162, a light shielding film 163, color filters (153r, 153g, and 153b), an opposite electrode 143b that configures electrode pair 143, and oriented film 164.

Moreover, in opposite substrate 151B, oriented film 164, opposite electrode 143b, color filters (153r, 153g, and 153b), glass substrate 162, and polarization filter 161 are disposed in the stated order from a side of liquid crystal layer 152. Light shielding film 163 is formed on the same layer as color filters (153*r*, 153*g*, and 153*b*).

Color filter 153*r* is a filter that transmits light of a red wavelength. Color filter 153*g* is a filter that transmits light of a green wavelength. Color filter 153*b* is a filter that transmits light of a blue wavelength. Here, photodiode 145 is disposed at a position that is opposite from color filter 153*b*.

Liquid crystal panel 140 displays the image by shielding light such as external light or light emitted from a light source such as backlight 179, or by transmitting the light. Specifically, liquid crystal panel 140 changes an orientation of liquid crystal molecules of liquid crystal layer 152 by applying a voltage between pixel electrode 143*a* and opposite electrode 143*b*, thereby shielding or transmitting the light. However, in this example, polarization filter 161 that only transmits light with a specific polarization direction is disposed as it is not possible to completely shield the light only with the liquid crystals.

Although the present technology has been described and illustrated in detail, it is clearly understood that the same is by way of illustration and example only and is not to be taken by way of limitation, the scope of the present technology being interpreted by the terms of the appended claims.

The invention claimed is:

1. An image input device, comprising:
 a display and image sensing unit for displaying and sensing an image, said display and image sensing unit including:
  a transparent flat plate,
  a display unit for displaying an image on said flat plate, and
  an image sensing unit for sensing an image in a range of a contact surface of a document placed on said flat plate, the contact surface being in contact with said flat plate, said display unit displaying the image in the range;
 a contact sensing unit for sensing a contact of said document with said flat plate when a message is being displayed by said display unit; and
 a display control unit for controlling to display an image in an even and specific color when the contact of said document has been sensed by said contact sensing unit.

2. The image input device according to claim 1, further comprising:
 an image sensing instruction unit for outputting an image sensing instruction to sense the image on said contact surface to said image sensing unit when the image in said specific color is displayed; and
 an image input unit for inputting the image that has been sensed by said image sensing unit in response to said image sensing instruction.

3. The image input device according to claim 2, further comprising:
 a stationary state sensing unit for sensing a stationary state of said document when the contact of said document has been sensed by said contact sensing unit, wherein
 said image sensing instruction unit instructs to sense the image on said contact surface when the image in said specific color is displayed and the stationary state of said document has been sensed by said stationary state sensing unit.

4. The image input device according to claim 1, wherein said display control unit:
 displays a message to prompt a user to place said document on said flat plate when an image input is instructed from the user, and
 switches said message to the image in said specific color.

5. The image input device according to claim 4, further comprising:
 a stationary state sensing unit for sensing a stationary state of said document when the contact of said document has been sensed by said contact sensing unit, wherein
 said display control unit switches said message to the image in said specific color when the stationary state of said document has been sensed by said stationary state sensing unit.

6. The image input device according to claim 1, wherein said specific color is white.

7. The image input device according to claim 1, wherein said specific color includes first, second, and third colors, said display control unit switches the image to be displayed in said display unit to images in said first, second, and third colors when the contact of said document has been sensed by said contact sensing unit.

8. The image input device according to claim 7, further comprising:
 an image sensing instruction unit for outputting an image sensing instruction to sense the image on said contact surface every time when switching to one of the images in said first, second, and third colors;
 an image input unit for inputting the respective images of color components of said first, second, and third colors that have been sensed by said image sensing unit in response to said image sensing instruction; and
 a synthesizing unit for synthesizing the respective images of color components of said first, second, and third colors that have been inputted by said image input unit.

9. The image input device according to claim 7, wherein said first, second, and third colors are any of red, green, and blue, respectively.

10. The image input device according to claim 1, wherein said contact sensing unit instructs said image sensing unit to sense the image on said contact surface on a predetermined cycle, and senses the contact of said document based on an edge feature of the sensed image.

11. The image input device according to claim 1, wherein said contact sensing unit senses the contact of said document based on an output from a pressure sensor for sensing a pressure applied from outside to said display unit.

12. The image input device according to claim 1, further comprising:
 a stationary state sensing unit for sensing a stationary state of said document that is in contact with said flat plate;
 an image sensing instruction unit for outputting an image sensing instruction to sense the image on said contact surface to said image sensing unit when the stationary state of said document is sensed by said stationary state sensing unit; and
 an image input unit for inputting the image that has been sensed by said image sensing unit in response to said image sensing instruction.

13. The image input device according to claim 12, wherein said stationary state sensing unit instructs said image sensing unit to sense the image on said contact surface on a predetermined cycle, and senses the stationary state of said document based on an edge feature and a time difference of the sensed image.

14. The image input device according to claim 1, further comprising:
 an image input unit for inputting the image on said contact surface that has been sensed by said image sensing unit;
 a removal sensing unit for sensing removal of the contact of said document with said flat plate when the image is inputted by said image input unit; and a determination unit for determining whether an object is in contact or noncontact with an button area displayed in said display unit for accepting an instruction from a user when the image is inputted by said image input unit, wherein the determination by said determination unit is disabled while a sensing process is carried out by said removal sensing unit.

15. The image input device according to claim 14, wherein said removal sensing unit instructs said image sensing unit to sense the image on said contact surface on a predetermined cycle, and senses the removal of the contact of said document based on an edge feature of the sensed image.

16. The image input device according to claim 14, wherein said removal sensing unit senses the removal of the contact of said document based on an output from a pressure sensor for sensing a pressure applied form outside to said display unit.

17. An image input method, comprising:

a step of sensing a contact of a document with a transparent flat plate provided for a display and image sensing unit for displaying and sensing an image, wherein the step of sensing contact of a document occurs while a message is being displayed by the display and image sensing unit;

a step of displaying an image in an even and specific color when the contact of said document has been sensed; and a step of inputting an image on a contact surface of said document that is in contact with said flat plate by sensing the image on said contact surface when the image in said specific color is displayed.

* * * * *